United States Patent
Zhou et al.

(10) Patent No.: US 12,197,693 B2
(45) Date of Patent: Jan. 14, 2025

(54) METHOD AND DEVICE FOR DISPLAYING A PROJECTION INTERFACE

(71) Applicant: Huawei Technologies Co., Ltd., Shenzhen (CN)

(72) Inventors: Xueer Zhou, Nanjing (CN); Fanxiang Wei, Shenzhen (CN); Min Liu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/042,688

(22) PCT Filed: Aug. 26, 2021

(86) PCT No.: PCT/CN2021/114825
§ 371 (c)(1),
(2) Date: Feb. 23, 2023

(87) PCT Pub. No.: WO2022/042656
PCT Pub. Date: Mar. 3, 2022

(65) Prior Publication Data
US 2023/0333703 A1    Oct. 19, 2023

(30) Foreign Application Priority Data
Aug. 26, 2020  (CN) .......................... 202010873983.5

(51) Int. Cl.
*G06F 3/04812*    (2022.01)
*G06F 3/038*    (2013.01)
*G06F 3/14*    (2006.01)

(52) U.S. Cl.
CPC .......... *G06F 3/04812* (2013.01); *G06F 3/038* (2013.01); *G06F 3/1454* (2013.01)

(58) Field of Classification Search
CPC ..... G06F 3/04812; G06F 3/038; G06F 3/1454
See application file for complete search history.

(56) References Cited

U.S. PATENT DOCUMENTS 6,211,879 B1 *    4/2001    Soohoo ................. G06F 3/0485
715/854
6,331,840 B1    12/2001    Nielson et al.
(Continued)

FOREIGN PATENT DOCUMENTS

| CN | 101354639 A | 1/2009 |
| CN | 101794448 A | 8/2010 |

(Continued)

OTHER PUBLICATIONS

Wang Changhong, "Try the remote projection function," Computer Knowledge and Technology (Experience Skills), Issue 11, 2018, with an English translation, 6 pages.
(Continued)

*Primary Examiner* — Asher D Kells
(74) *Attorney, Agent, or Firm* — Conley Rose, P.C.

(57) ABSTRACT

A first terminal displays a projection interface on a display of the first terminal, where content of the projection interface is a mirror of content of a first interface displayed on a display of a second terminal. The first terminal receives a first operation input, using an input device of the first terminal, to move a first cursor on the display of the first terminal. When the first cursor moves to the content of the projection interface, a cursor style of the first cursor is changed, or a display manner of the content is changed.

18 Claims, 21 Drawing Sheets

(56) References Cited

U.S. PATENT DOCUMENTS

| | | | |
|---|---|---|---|
| 7,730,425 B2 | 6/2010 | de los Reyes et al. | |
| 8,531,519 B1 | 9/2013 | Peng et al. | |
| 8,607,150 B2 | 12/2013 | Tsai | |
| 8,806,364 B2 | 8/2014 | Hwang | |
| 9,696,825 B2* | 7/2017 | Lin | G06F 3/038 |
| 10,168,868 B2 | 1/2019 | Lee et al. | |
| 10,234,953 B1 | 3/2019 | Li et al. | |
| 11,029,838 B2 | 6/2021 | Lemay et al. | |
| 11,036,310 B2 | 6/2021 | Seo et al. | |
| 11,196,933 B2 | 12/2021 | Misawa et al. | |
| 11,599,322 B1 | 3/2023 | Johnson et al. | |
| 2001/0012025 A1 | 8/2001 | Wojaczynski et al. | |
| 2006/0038741 A1 | 2/2006 | Mori et al. | |
| 2006/0136828 A1* | 6/2006 | Asano | G06F 3/1454 |
| | | | 715/764 |
| 2007/0055941 A1 | 3/2007 | Bhakta et al. | |
| 2007/0288599 A1 | 12/2007 | Saul et al. | |
| 2009/0027302 A1 | 1/2009 | Li | |
| 2010/0041442 A1 | 2/2010 | Hong | |
| 2010/0070899 A1 | 3/2010 | Hunt et al. | |
| 2010/0281363 A1 | 11/2010 | Inaba | |
| 2011/0083099 A1 | 4/2011 | Eun | |
| 2011/0209103 A1 | 8/2011 | Hinckley et al. | |
| 2012/0046071 A1 | 2/2012 | Brandis et al. | |
| 2012/0096396 A1 | 4/2012 | Ording et al. | |
| 2012/0216126 A1 | 8/2012 | Trivedi et al. | |
| 2012/0297341 A1* | 11/2012 | Glazer | G06F 9/45504 |
| | | | 715/764 |
| 2013/0009887 A1* | 1/2013 | Huang | H04L 65/752 |
| | | | 345/173 |
| 2013/0050277 A1 | 2/2013 | Wang et al. | |
| 2013/0080143 A1 | 3/2013 | Reeves et al. | |
| 2013/0145290 A1 | 6/2013 | Weber et al. | |
| 2013/0162538 A1* | 6/2013 | Ichieda | G09G 5/00 |
| | | | 345/173 |
| 2013/0204945 A1 | 8/2013 | Li et al. | |
| 2013/0318451 A1 | 11/2013 | Wu et al. | |
| 2013/0321340 A1 | 12/2013 | Seo et al. | |
| 2013/0332872 A1 | 12/2013 | Grinberg | |
| 2013/0342482 A1 | 12/2013 | Kim et al. | |
| 2014/0009394 A1* | 1/2014 | Lee | H04N 21/41407 |
| | | | 345/157 |
| 2014/0019874 A1 | 1/2014 | Li et al. | |
| 2014/0082519 A1 | 3/2014 | Wang et al. | |
| 2014/0136986 A1 | 5/2014 | Martin et al. | |
| 2014/0222663 A1 | 8/2014 | Park et al. | |
| 2014/0292720 A1 | 10/2014 | Liang | |
| 2014/0365957 A1 | 12/2014 | Louch | |
| 2015/0012831 A1 | 1/2015 | Boggess | |
| 2015/0020013 A1* | 1/2015 | Kim | G06F 3/0488 |
| | | | 715/769 |
| 2015/0160914 A1* | 6/2015 | Oitaira | G06F 3/04812 |
| | | | 715/761 |
| 2015/0180912 A1 | 6/2015 | Dufour | |
| 2015/0195607 A1 | 7/2015 | Kim et al. | |
| 2015/0293741 A1 | 10/2015 | Glazer | |
| 2015/0312458 A1 | 10/2015 | Chen et al. | |
| 2015/0356949 A1 | 12/2015 | Kim | |
| 2016/0050476 A1 | 2/2016 | Patil | |
| 2016/0092154 A1* | 3/2016 | Bourlier | G06F 3/1462 |
| | | | 345/2.2 |
| 2016/0117141 A1 | 4/2016 | Ro et al. | |
| 2016/0119464 A1 | 4/2016 | Kim | |
| 2016/0139776 A1 | 5/2016 | Donahue et al. | |
| 2016/0162243 A1 | 6/2016 | Neisler et al. | |
| 2016/0188275 A1* | 6/2016 | Huang | G06F 3/038 |
| | | | 715/761 |
| 2016/0216782 A1* | 7/2016 | Lin | G06F 3/0484 |
| 2016/0239110 A1* | 8/2016 | Chen | G06F 3/038 |
| 2016/0320937 A1 | 11/2016 | Zhou | |
| 2016/0342319 A1 | 11/2016 | Wang et al. | |
| 2016/0343350 A1 | 11/2016 | Khoury et al. | |
| 2017/0017454 A1* | 1/2017 | Kim | G06F 3/04845 |
| 2017/0031582 A1 | 2/2017 | Palandro et al. | |
| 2017/0052685 A1 | 2/2017 | Kovács et al. | |
| 2017/0199715 A1* | 7/2017 | Manchinasetti | G06F 3/048 |
| 2017/0228207 A1 | 8/2017 | Szeto et al. | |
| 2017/0277381 A1 | 9/2017 | Allyn | |
| 2017/0315702 A1 | 11/2017 | Tsao et al. | |
| 2017/0351472 A1 | 12/2017 | Passeri et al. | |
| 2018/0070122 A1* | 3/2018 | Baek | H04N 21/4438 |
| 2018/0077547 A1 | 3/2018 | Sanchez Barajas et al. | |
| 2018/0095623 A1 | 4/2018 | Haggar et al. | |
| 2018/0098018 A1* | 4/2018 | Cho | H04N 21/4316 |
| 2018/0107358 A1 | 4/2018 | Chodakowski et al. | |
| 2018/0129364 A1 | 5/2018 | Louch et al. | |
| 2018/0189972 A1 | 7/2018 | Humbert et al. | |
| 2018/0253207 A1 | 9/2018 | Wang et al. | |
| 2018/0324567 A1 | 11/2018 | Mao | |
| 2019/0098204 A1 | 3/2019 | Chen et al. | |
| 2019/0110100 A1* | 4/2019 | Gao | H04N 21/4858 |
| 2019/0196707 A1 | 6/2019 | Szeto et al. | |
| 2019/0200203 A1 | 6/2019 | Jiang | |
| 2019/0222631 A1 | 7/2019 | Li et al. | |
| 2019/0265941 A1 | 8/2019 | Baba | |
| 2019/0286032 A1 | 9/2019 | Suzuki | |
| 2019/0295498 A1* | 9/2019 | Lee | G06F 3/1423 |
| 2019/0303088 A1 | 10/2019 | Yuan | |
| 2019/0346986 A1 | 11/2019 | Nilo et al. | |
| 2019/0371003 A1 | 12/2019 | Lin et al. | |
| 2020/0004394 A1 | 1/2020 | Li et al. | |
| 2020/0019367 A1* | 1/2020 | Sun | G06F 3/1423 |
| 2020/0045235 A1 | 2/2020 | Ono | |
| 2020/0053417 A1* | 2/2020 | Choi | H04N 21/631 |
| 2020/0192564 A1 | 6/2020 | Zhu et al. | |
| 2020/0257425 A1 | 8/2020 | Ye | |
| 2020/0388051 A1 | 12/2020 | Lin et al. | |
| 2020/0409541 A1 | 12/2020 | Luo et al. | |
| 2021/0004220 A1 | 1/2021 | Hao et al. | |
| 2021/0027742 A1 | 1/2021 | Li | |
| 2021/0064191 A1 | 3/2021 | Liao et al. | |
| 2021/0181939 A1* | 6/2021 | Lee | G06F 3/04812 |
| 2021/0240332 A1* | 8/2021 | Walkin | G06F 3/0489 |
| 2021/0263642 A1* | 8/2021 | Li | G06F 3/0486 |
| 2022/0224968 A1 | 1/2022 | Wang et al. | |
| 2022/0147228 A1 | 5/2022 | Yi et al. | |
| 2022/0164091 A1* | 5/2022 | Kang | G06F 3/1423 |
| 2022/0229624 A1 | 7/2022 | Xiong et al. | |
| 2022/0229708 A1 | 7/2022 | Hu | |
| 2022/0279062 A1 | 9/2022 | Ye | |
| 2022/0291892 A1 | 9/2022 | Gu | |
| 2022/0300153 A1* | 9/2022 | Gu | H04M 1/72412 |
| 2022/0334855 A1 | 10/2022 | Meng | |
| 2022/0342850 A1 | 10/2022 | Cao et al. | |
| 2022/0413671 A1 | 12/2022 | Liu | |
| 2023/0041287 A1 | 2/2023 | Tian et al. | |
| 2023/0153274 A1 | 5/2023 | Liu | |
| 2023/0176705 A1* | 6/2023 | Kwon | G06F 3/04812 |
| | | | 715/740 |
| 2023/0205393 A1 | 6/2023 | Yamada et al. | |
| 2023/0244373 A1 | 8/2023 | Pan et al. | |

FOREIGN PATENT DOCUMENTS

| | | |
|---|---|---|
| CN | 101865656 A | 10/2010 |
| CN | 102333152 A | 1/2012 |
| CN | 102419689 A | 4/2012 |
| CN | 102523346 A | 6/2012 |
| CN | 102620713 A | 8/2012 |
| CN | 102646117 A | 8/2012 |
| CN | 102687117 A | 9/2012 |
| CN | 102945131 A | 2/2013 |
| CN | 103245337 A | 8/2013 |
| CN | 103279288 A | 9/2013 |
| CN | 103425408 A | 12/2013 |
| CN | 103873637 A | 6/2014 |
| CN | 103973979 A | 8/2014 |
| CN | 104137048 A | 11/2014 |
| CN | 104268251 A | 1/2015 |
| CN | 104349110 A | 2/2015 |
| CN | 104484144 A | 4/2015 |
| CN | 104811793 A | 7/2015 |
| CN | 105183343 A | 12/2015 |

(56) References Cited

FOREIGN PATENT DOCUMENTS

| | | |
|---|---|---|
| CN | 105512086 A | 4/2016 |
| CN | 105516754 A | 4/2016 |
| CN | 105549869 A | 5/2016 |
| CN | 105549870 A | 5/2016 |
| CN | 105556451 A | 5/2016 |
| CN | 105635948 A | 6/2016 |
| CN | 105681441 A | 6/2016 |
| CN | 105843470 A | 8/2016 |
| CN | 105892851 A | 8/2016 |
| CN | 105955689 A | 9/2016 |
| CN | 105979148 A | 9/2016 |
| CN | 106055202 A | 10/2016 |
| CN | 106095237 A | 11/2016 |
| CN | 106354451 A | 1/2017 |
| CN | 106406127 A | 2/2017 |
| CN | 106657651 A | 5/2017 |
| CN | 106844063 A | 6/2017 |
| CN | 107085508 A | 8/2017 |
| CN | 107124690 A | 9/2017 |
| CN | 107222936 A | 9/2017 |
| CN | 107329927 A | 11/2017 |
| CN | 107425942 A | 12/2017 |
| CN | 107479784 A | 12/2017 |
| CN | 107491469 A | 12/2017 |
| CN | 107506039 A | 12/2017 |
| CN | 107846617 A | 3/2018 |
| CN | 107908489 A | 4/2018 |
| CN | 107943439 A | 4/2018 |
| CN | 108037972 A | 5/2018 |
| CN | 108123826 A | 6/2018 |
| CN | 108154538 A | 6/2018 |
| CN | 108228020 A | 6/2018 |
| CN | 108268640 A | 7/2018 |
| CN | 108399529 A | 8/2018 |
| CN | 108447097 A | 8/2018 |
| CN | 108616561 A | 10/2018 |
| CN | 108647062 A | 10/2018 |
| CN | 108702414 A | 10/2018 |
| CN | 108717714 A | 10/2018 |
| CN | 108718439 A | 10/2018 |
| CN | 104618793 B | 11/2018 |
| CN | 108734736 A | 11/2018 |
| CN | 108762619 A | 11/2018 |
| CN | 108765498 A | 11/2018 |
| CN | 108781235 A | 11/2018 |
| CN | 108829323 A | 11/2018 |
| CN | 108874713 A | 11/2018 |
| CN | 108900764 A | 11/2018 |
| CN | 108958684 A | 12/2018 |
| CN | 108984137 A | 12/2018 |
| CN | 109099888 A | 12/2018 |
| CN | 109120970 A | 1/2019 |
| CN | 109164964 A | 1/2019 |
| CN | 109462692 A | 3/2019 |
| CN | 109525697 A | 3/2019 |
| CN | 109644263 A | 4/2019 |
| CN | 109669747 A | 4/2019 |
| CN | 109690967 A | 4/2019 |
| CN | 109739450 A | 5/2019 |
| CN | 109753215 A | 5/2019 |
| CN | 109803126 A | 5/2019 |
| CN | 208849986 U | 5/2019 |
| CN | 109889885 A | 6/2019 |
| CN | 109922205 A | 6/2019 |
| CN | 110109636 A | 8/2019 |
| CN | 110113538 A | 8/2019 |
| CN | 110221798 A | 9/2019 |
| CN | 110243386 A | 9/2019 |
| CN | 110267073 A | 9/2019 |
| CN | 110278338 A | 9/2019 |
| CN | 110321093 A | 10/2019 |
| CN | 110333814 A | 10/2019 |
| CN | 110363819 A | 10/2019 |
| CN | 110417992 A | 11/2019 |
| CN | 110443853 A | 11/2019 |
| CN | 110471639 A | 11/2019 |
| CN | 110473262 A | 11/2019 |
| CN | 110489042 A | 11/2019 |
| CN | 110515576 A | 11/2019 |
| CN | 110515579 A | 11/2019 |
| CN | 110515580 A | 11/2019 |
| CN | 110557674 A | 12/2019 |
| CN | 110574359 A | 12/2019 |
| CN | 110597473 A | 12/2019 |
| CN | 110602805 A | 12/2019 |
| CN | 110618970 A | 12/2019 |
| CN | 110673782 A | 1/2020 |
| CN | 110703966 A | 1/2020 |
| CN | 107925694 B | 2/2020 |
| CN | 110750197 A | 2/2020 |
| CN | 110806831 A | 2/2020 |
| CN | 110908625 A | 3/2020 |
| CN | 111079550 A | 4/2020 |
| CN | 111107222 A | 5/2020 |
| CN | 111125526 A | 5/2020 |
| CN | 111158540 A | 5/2020 |
| CN | 111190559 A | 5/2020 |
| CN | 111221491 A | 6/2020 |
| CN | 111240547 A | 6/2020 |
| CN | 111240575 A | 6/2020 |
| CN | 111290675 A | 6/2020 |
| CN | 111314768 A | 6/2020 |
| CN | 111324327 A | 6/2020 |
| CN | 111327769 A | 6/2020 |
| CN | 111399789 A | 7/2020 |
| CN | 111399959 A | 7/2020 |
| CN | 111443884 A | 7/2020 |
| CN | 111666055 A | 9/2020 |
| CN | 111782427 A | 10/2020 |
| CN | 111858522 A | 10/2020 |
| CN | 111949350 A | 11/2020 |
| CN | 112083867 A | 12/2020 |
| CN | 112148182 A | 12/2020 |
| CN | 112527221 A | 3/2021 |
| CN | 111666055 B | 12/2021 |
| CN | 114356198 A | 4/2022 |
| EP | 2632188 A1 | 8/2013 |
| EP | 4080345 A1 | 10/2022 |
| EP | 4095671 A1 | 11/2022 |
| EP | 4177725 A1 | 5/2023 |
| JP | 2012063865 A | 3/2012 |
| JP | 2018097880 A | 6/2018 |
| KR | 20110076153 A | 7/2011 |
| KR | 20180042643 A | 4/2018 |
| WO | 0203186 A2 | 1/2002 |
| WO | 2015197908 A1 | 12/2015 |
| WO | 2018120884 A1 | 7/2018 |
| WO | 2019071872 A1 | 4/2019 |
| WO | WO-2022256681 A2 * | 12/2022 ............ G06F 3/038 |

OTHER PUBLICATIONS

Marquardt Nicolai et al: "Gradual engagement facilitating information exchange between digital devices as a function of proximity," Proceedings of the Third ACM Conference on Data and Application Security and Privacy, CODASPY'13, ACM Press, New York, New York, USA, Nov. 11, 2012, pp. 31-40, XP058985017, 10 pages total.

Han Yumin, Classification of Interaction Modes and Its Significance, CD Technology, Editorial Department Mailbox, Issue 02, 1997, with the English Abstract, 5 pages.

Yang Bowen et al, Camera Calibration Technique of Wide-Area Vision Measurement, Acta Optica Sinica, vol. 32, No. 9, with the English Abstract, 9 pages.

* cited by examiner

| Cursor style | Cursor type |
|---|---|
| ⬚ | Normal selection |
| ☝ | Link selection |
| I | Text selection |
| ✥ | Move |
| ↕ | Vertical adjustment |
| ... | ... |

FIG. 11

METHOD AND DEVICE FOR DISPLAYING A PROJECTION INTERFACE

CROSS-REFERENCE TO RELATED APPLICATIONS IDC

This is a National Stage of International Patent Application No. PCT/CN2021/114825 filed on Aug. 26, 2021, which claims priority to Chinese Patent Application No. 202010873983.5 filed on Aug. 26, 2020. Both of the aforementioned applications are hereby incorporated by reference in their entireties.

TECHNICAL FIELD

This application relates to the field of electronic devices, and in particular, to an interface display method and a device.

BACKGROUND

Nowadays, a user may have more terminals such as a mobile phone, a tablet computer, and a personal computer (personal computer, PC). In a scenario in which a plurality of terminals need to be cooperatively used, for example, collaborative office, the user may connect the plurality of terminals for use.

For example, the user has a PC and a mobile phone. The user may connect the PC and the mobile phone in a wireless or wired manner for cooperative use, so that the PC and the mobile phone can be used together for collaborative office. In a scenario in which the PC and the mobile phone are used together for collaborative office, multi-screen collaboration provides projection and display of a display interface of the mobile phone on a display of the PC through mirror projection. For ease of description, an interface that is projected by the mobile phone and that is displayed on the PC may be referred to as a projection interface. For example, in FIG. 1, a projection interface 102 is a home screen 101 of a mobile phone. Then, the user may perform mouse operations such as mouse click and mouse move on the projection interface by using a mouse of the PC, to implement an operation on an actual interface displayed on the mobile phone.

However, in a process in which the user performs a mouse operation on the projection interface by using the mouse of the PC, when a cursor moves to a control on the projection interface, usually, there is no visual feedback. For example, there is no visual feedback on the control, or a style of the cursor does not change accordingly.

SUMMARY

Embodiments of this application provide an interface display method and a device. When a user moves a cursor to a control on a projection interface by using a mouse of a PC, the control and/or the cursor may provide corresponding visual feedback.

To achieve the foregoing objective, this application uses the following technical solutions.

According to a first aspect, an embodiment of this application provides an interface display method, applied to a first terminal, where the first terminal is connected to a second terminal, and the method may include:

The first terminal displays a projection interface on a display of the first terminal, where content of the projection interface is a mirror of content of a first interface displayed on a display of the second terminal, and the first terminal receives a first operation input by a user by using an input device of the first terminal, where the first operation is used to move a first cursor on the display of the first terminal. When the first cursor moves to first content of the projection interface, a cursor style of the first cursor is a first style, and/or a display manner of the first content is changed from a first manner to a second manner. When the first cursor moves to second content of the projection interface, the cursor style of the first cursor is a second style, and/or a display manner of the second content is changed from a third manner to a fourth manner.

In this embodiment, the content of the projection interface may be an element displayed on the projection interface. In this embodiment, the first content and the second content are different elements displayed on the projection interface. The cursor style displayed when the first cursor moves to the first content is different from the cursor style displayed when the first cursor moves to the second content. That is, the first style is different from the second style. In addition, the first manner may be the same as or different from the third manner. The second manner may be the same as or different from the fourth manner.

According to the method provided in this embodiment, when the user operates an input device such as a mouse or a touchpad of a projection destination end such as the first terminal to move a cursor to content of a projection interface, the content and/or the cursor on the projection interface provide/provides corresponding visual feedback, for example, the content of the projection interface presents a highlighted background, and a cursor style changes accordingly. In this way, the user may visually determine whether the next operation may be performed on the control that corresponds to the control on the projection interface and that is displayed at the projection source end, thereby improving use experience.

In a possible implementation, the projection interface is displayed in a part of the display of the first terminal. The method may further include: In response to the first operation, the first terminal displays, on the display of the first terminal, an animation in which the first cursor moves; and in a process in which the first cursor moves on the display of the first terminal, the first terminal sends an initial coordinate location at which the first cursor enters the projection interface to the second terminal, and sends data of the first operation to the second terminal. The initial coordinate location is a coordinate location of the first cursor relative to a first corner of the projection interface when the first cursor enters the projection interface, and is used by the second terminal to display a second cursor on the display of the second terminal. The data of the first operation is used to move the second cursor on the display of the second terminal, so that when the first cursor moves to the first content, the second cursor moves to content that is of the first interface and that corresponds to the first content, and when the second cursor moves to the content corresponding to the first content, a cursor style of the second cursor is the first style, and so that when the first cursor moves to the second content, the second cursor moves to content that is of the first interface and that corresponds to the second content, and when the second cursor moves to the content corresponding to the second content, the cursor style of the second cursor is the second style.

When the first cursor moves to the first content of the projection interface, the first terminal receives a cursor type of the first style from the second terminal, and displays the first cursor based on the cursor type of the first style, so that the first cursor is displayed in the first style. When the first cursor moves to the second content of the projection interface, the first terminal receives a cursor type of the second style from the second terminal, and displays the first cursor based on the cursor type of the second style, so that the first cursor is displayed in the second style.

After the first cursor enters the projection interface, the first terminal sends corresponding operation data to the second terminal, so that the second terminal may move the cursor of the second terminal based on the operation data, and feed back a cursor style to the first terminal, so that the cursor style of the first cursor on the first terminal may be accordingly changed, and the cursor provides a visual effect of visual feedback for the user after the cursor is moved to corresponding content of the projection interface.

In another possible implementation, when the second cursor moves to the content corresponding to the first content, a display manner of the content that is of the first interface and that corresponds to the first content is changed from the first manner to the second manner. The method may further include: The first terminal updates the projection interface after the first cursor moves to the first content of the projection interface, where a display manner of the first content of the projection interface before update is the first manner, and a display manner of the first content of the projection interface after update is the second manner.

In another possible implementation, when the second cursor moves to the content corresponding to the second content, a display manner of the content that is of the first interface and that corresponds to the second content is changed from the third manner to the fourth manner. The method may further include: The first terminal updates the projection interface after the first cursor moves to the second content of the projection interface, where a display manner of the second content of the projection interface before update is the third manner, and a display manner of the second content of the projection interface after update is the fourth manner.

After the first cursor enters the projection interface, the first terminal sends corresponding operation data to the second terminal, so that the second terminal may move the cursor of the second terminal to corresponding content based on the operation data, so that the content provides corresponding visual feedback. The first terminal updates the projection interface, so that a display manner of the corresponding content of the first terminal may also be accordingly changed, and the content provides a visual effect of visual feedback for the user after the cursor moves to the corresponding content of the projection interface.

In another possible implementation, transparency of the second cursor is greater than a threshold.

In another possible implementation, the sending data of the first operation to the second terminal may include: After the first cursor enters the projection interface, in a process in which the user inputs the first operation by using the input device of the first terminal, the first terminal obtains a first operation parameter in a received first input event, where the first input event is a movement event corresponding to the first operation; and the first terminal sends the first operation parameter to the second terminal, where the first operation parameter is used by the second terminal to simulate the first input event, so as to move the second cursor.

In another possible implementation, the method may further include: When the first cursor moves to the first content of the projection interface, the first terminal receives a second operation input by the user by using the input device of the first terminal; the first terminal sends data of the second operation to the second terminal, where the data of the second operation is used by the second terminal to display a second interface, and the first terminal updates the projection interface, where content of the projection interface after update is a mirror of content of the second interface. After the cursor moves to the content of the projection interface, if the user performs an operation on the content, the first terminal sends corresponding operation data to the second terminal, so that the second terminal makes a corresponding response. The first terminal updates the projection interface, so that an updated interface of the second terminal can be correspondingly projected to the first terminal.

In another possible implementation, that the first terminal sends data of the second operation to the second terminal may include: After the user inputs the second operation by using the input device of the first terminal, the first terminal intercepts a second input event corresponding to the second operation; and the first terminal obtains a second operation parameter in the second input event and sends the second operation parameter to the second terminal, where the second operation parameter is used by the second terminal to simulate the second input event, so as to display the second interface.

In another possible implementation, the first operation corresponds to a movement event. After the first cursor enters the projection interface, the method may further include: The first terminal enables interception of an input event, to intercept another input event other than the movement event; and the first terminal sends first indication information to the second terminal, where the first indication information indicates that sharing starts.

In another possible implementation, after the first cursor moves out of the projection interface, the method may further include: The first terminal cancels interception of an input event; and the first terminal sends second indication information to the second terminal, where the second indication information indicates that sharing stops.

In another possible implementation, after the first cursor enters the projection interface, the first terminal may adjust transparency of the first cursor, where an adjusted transparency of the first cursor is greater than a threshold; and the first terminal may further intercept the first input event, and send the first operation parameter of the first input event to the second terminal, so that the second terminal simulates the first input event based on the first operation parameter, so as to move the second cursor. In this way, when the second cursor moves to the content that is of the first interface and that corresponds to the first content, the first terminal updates the projection interface. The cursor on the updated interface moves to the first content of the projection interface, and a cursor style of the cursor on the projection interface after update is the first style; and/or a display manner of the first content before update is the first manner, and a display manner of the first content after update is the second manner. After the second cursor moves to the content that is of the first interface and that corresponds to the second content, the first terminal updates the projection interface. The cursor on the updated interface moves to the second content of the projection interface, and a cursor style of the cursor on the projection interface after update is the second style; and/or a display manner of the second content before update is the first manner, and a display manner of the second content after update is the second manner. It may be understood that, by updating the projection interface, the first terminal may provide a visual effect of corresponding visual feedback on the content and/or the cursor on the projection interface when the user moves the cursor to the content of the projection interface.

According to a second aspect, an embodiment of this application provides an interface display method, applied to a second terminal, where the second terminal is connected to a first terminal, and the method may include:

The second terminal displays a first interface, and projects and displays the first interface on the first terminal, so that the first terminal displays a projection interface; the second terminal displays a second cursor on the first interface when a first cursor of the first terminal enters the projection interface; the second terminal receives a first operation input by a user by using an input device of the first terminal, where the first operation is used to move the second cursor on a display of the second terminal; when the second cursor moves to fast content of the first interface, the second terminal displays the second cursor in a first style, and/or changes a display manner of the first content from a first manner to a second manner, so that when the first cursor moves to content that is of the projection interface and that corresponds to the first content, the first cursor is displayed in the first style, and/or a display manner of the content corresponding to the first content of the projection interface is changed from the first manner to the second manner; and when the second cursor moves to second content of the first interface, the second terminal displays the second cursor in a second style, and/or changes a display manner of the second content from a third manner to a fourth manner, so that when the first cursor moves to content that is of the projection interface and that corresponds to the second content, the first cursor is displayed in the second style, and/or a display manner of the content that is of the projection interface and that corresponds to the second content is changed from the first manner to the second manner.

In a possible implementation, after the second terminal displays the second cursor in the first style, the method may further include: The second terminal sends a cursor type of the first style to the first terminal, where the cursor type of the first style is used by the first terminal to display the first cursor, so that the first cursor is displayed in the first style. After the second terminal displays the second cursor in the second style, the method may further include: The second terminal sends a cursor type of the second style to the first terminal, where the cursor type of the second style is used by the first terminal to display the first cursor, so that the first cursor is displayed in the second style. The second terminal may feed back a cursor style of the second cursor to the first terminal, so that a cursor style of the first cursor on the first terminal may be accordingly changed, and the cursor provides a visual effect of visual feedback for the user after the cursor moves to corresponding content of the projection interface.

In another possible implementation, transparency of the second cursor is greater than a threshold.

In another possible implementation, that the second terminal displays a second cursor on the first interface when a first cursor of the first terminal enters the projection interface may include: The second terminal receives an initial coordinate location at which the first cursor enters the projection interface from the first terminal; the second terminal determines a start location based on the initial coordinate location, a size of the projection interface, and a resolution of the second terminal, where the start location may be a coordinate location relative to a first corner of a display of the second terminal; and the second terminal displays the second cursor at the start location.

In another possible implementation, that the second terminal receives a first operation input by a user by using an input device of the first terminal may include: The second terminal receives a first operation parameter from the first terminal, where the first operation parameter is an operation parameter in a first input event received by the first terminal in a process in which the user inputs, by using the input device of the first terminal, the first operation after the first cursor enters the projection interface, and the first operation parameter includes relative displacement of the first cursor relative to the initial coordinate location: the second terminal determines relative displacement of the second cursor relative to the start location based on the relative displacement of the first cursor relative to the initial coordinate location; and the second terminal simulates the first input event based on the determined relative displacement of the second cursor relative to the start location and another parameter in the first operation parameter. The relative displacement in the received operation parameter is converted, so that after the first cursor moves, the second cursor may move to corresponding content.

The method may further include: The second terminal displays, on the display of the second terminal based on the first input event, an animation in which the second cursor moves.

In another possible implementation, the method may further include: When the second cursor moves to the first content of the first interface, the second terminal receives a second operation input by the user by using the input device of the first terminal; and in response to the second operation, the second terminal displays a second interface, and projects and displays the second interface on the first terminal, so that content of the projection interface of the first terminal after update is a mirror of content of the second interface.

In another possible implementation, that the second terminal receives a second operation input by the user by using the input device of the first terminal may include: The second terminal receives a second operation parameter from the first terminal, where the second operation parameter is an operation parameter included in a second input event intercepted by the first terminal after the user inputs, by using the input device of the first terminal, the second operation when the first cursor moves to the content that is of the projection interface and that corresponds to the first content; and the second terminal simulates the second input event based on the second operation parameter, where the second input event is used to display the second interface.

In another possible implementation, when the first cursor of the first terminal enters the projection interface, the method may further include: The second terminal receives first indication information from the first terminal, where the first indication information indicates that sharing starts.

In another possible implementation, the method may further include: The second terminal receives second indication information from the first terminal, where the second indication information indicates that sharing stops, and the second indication information is sent by the first terminal after the first terminal determines that the first cursor moves out of the projection interface.

According to a third aspect, an embodiment of this application provides an interface display apparatus, applied to a first terminal, where the first terminal is connected to a second terminal, and the apparatus may include:

a display unit, configured to display a projection interface on a display of the first terminal, where content of the projection interface is a mirror of content of a first interface displayed on a display of the second terminal;

and an input unit, configured to receive a first operation input by a user by using an input device of the first terminal, where the first operation is used to move a first cursor on a display of the first terminal. When the first cursor moves to first content of the projection interface, a cursor style of the first cursor is a first style, and/or a display manner of the first content is changed from a first manner to a second manner. When the first cursor moves to second content of the projection interface, the cursor style of the first cursor is a second style, and/or a display manner of the second content is changed from a third manner to a fourth manner.

In a possible implementation, the projection interface is displayed in a part of the display of the first terminal. The display unit is further configured to display, on the display of the first terminal in response to the first operation, an animation in which the first cursor moves. The apparatus may further include: a sending unit, configured to: in a process in which the first cursor moves on the display of the first terminal, when it is determined that the first cursor enters the projection interface, send an initial coordinate location at which the first cursor enters the projection interface to the second terminal, and send data of the first operation to the second terminal. The initial coordinate location is a coordinate location of the first cursor relative to a first corner of the projection interface when the first cursor enters the projection interface, and is used by the second terminal to display a second cursor on the display of the second terminal. The data of the first operation is used to move the second cursor on the display of the second terminal, so that when the first cursor moves to the first content, the second cursor moves to content that is of the first interface and that corresponds to the first content, and when the second cursor moves to the content corresponding to the first content, a cursor style of the second cursor is the first style, and so that when the first cursor moves to the second content, the second cursor moves to content that is of the first interface and that corresponds to the second content, and when the second cursor moves to the content corresponding to the second content, the cursor style of the second cursor is the second style.

The apparatus may further include a receiving unit.

The receiving unit is configured to receive a cursor type of the first style from the second terminal when the first cursor moves to the first content of the projection interface. The display unit is further configured to display the first cursor based on the cursor type of the first style, so that the first cursor is displayed in the first style. The receiving unit is further configured to receive a cursor type of the second style from the second terminal when the first cursor moves to the second content of the projection interface. The display unit is further configured to display the first cursor based on the cursor type of the second style, so that the first cursor is displayed in the second style.

In another possible implementation, when the second cursor moves to the content corresponding to the first content, a display manner of the content that is of the first interface and that corresponds to the first content is changed from the first manner to the second manner. The display unit is further configured to update the projection interface after the first cursor moves to the first content of the projection interface, where a display manner of the first content of the projection interface before update is the first manner, and a display manner of the first content of the projection interface after update is the second manner.

In another possible implementation, when the second cursor moves to the content corresponding to the second content, a display manner of the content that is of the first interface and that corresponds to the second content is changed from the third manner to the fourth manner. The display unit is further configured to update the projection interface after the first cursor moves to the second content of the projection interface, where a display manner of the second content of the projection interface before update is the third manner, and a display manner of the second content of the projection interface after update is the fourth manner.

In another possible implementation, transparency of the second cursor is greater than a threshold.

In another possible implementation, the apparatus may further include: an obtaining unit, configured to: after the first cursor enters the projection interface, in a process in which the user inputs the first operation by using the input device of the first terminal, obtain a first operation parameter in a received first input event, where the first input event is a movement event corresponding to the first operation. The sending unit is specifically configured to send the first operation parameter to the second terminal, where the first operation parameter is used by the second terminal to simulate the first input event, so as to move the second cursor.

In another possible implementation, the input unit is further configured to: when the first cursor moves to the first content of the projection interface, receive a second operation input by the user by using the input device of the first terminal. The sending unit is further configured to send data of the second operation to the second terminal, where the data of the second operation is used by the second terminal to display a second interface. The display unit is further configured to update the projection interface, where content of the projection interface after update is a mirror of content of the second interface.

In another possible implementation, the obtaining unit is further configured to: after the user inputs the second operation by using the input device of the first terminal, intercept a second input event corresponding to the second operation, and obtain a second operation parameter in the second input event. The sending unit is specifically configured to send the second operation parameter to the second terminal, where the second operation parameter is used by the second terminal to simulate the second input event, so as to display the second interface.

In another possible implementation, the first operation corresponds to a movement event. The obtaining unit is further configured to enable interception of an input event, to intercept another input event other than the movement event. The sending unit is further configured to send first indication information to the second terminal, where the first indication information indicates that sharing starts.

In another possible implementation, after the first cursor moves out of the projection interface, the obtaining unit is further configured to cancel interception of an input event. The sending unit is further configured to send second indication information to the second terminal, where the second indication information indicates that sharing stops.

According to a fourth aspect, an embodiment of this application provides an interface display apparatus, applied to a second terminal, where the second terminal is connected to a first terminal, and the apparatus may include:

a display unit, configured to display a first interface; a projection unit, configured to project and display the first interface on the first terminal, so that the first terminal displays a projection interface, where the display unit is further configured to display a second cursor on the first interface when a first cursor of the first terminal enters the projection interface; and a receiving unit, configured to receive a first operation input by a user by using an input device of the first terminal, where the first operation is used to move the second cursor on a display of the second terminal. The display unit is further configured to: when the second cursor moves to first content of the first interface, display the second cursor in a first style, and/or change a display manner of the first content from a first manner to a second manner, so that when the first cursor moves to content that is of the projection interface and that corresponds to the first content, the first cursor is displayed in the first style, and/or change a display manner of the content that is of the projection interface and that corresponds to the first content from the first manner to the second manner. The display unit is further configured to: when the second cursor moves to second content of the first interface, display the second cursor in a second style, and/or change a display manner of the second content from a third manner to a fourth manner, so that when the first cursor moves to content that is of the projection interface and that corresponds to the second content, the first cursor is displayed in the second style, and/or change a display manner of the content that is of the projection interface and that corresponds to the second content from the third manner to the fourth manner.

In a possible implementation, the apparatus may further include: a sending unit, configured to send a cursor type of the first style to the first terminal after the second cursor is displayed in the first style, where the cursor type of the first style is used by the first terminal to display the first cursor, so that the first cursor is display in the first style. The sending unit is further configured to send a cursor type of the second style to the first terminal after the second cursor is displayed in the second style, where the cursor type of the second style is used by the first terminal to display the first cursor, so that the first cursor is display in the second style.

In another possible implementation, transparency of the second cursor is greater than a threshold.

In another possible implementation, the receiving unit is further configured to receive, from the first terminal, an initial coordinate location at which the first cursor enters the projection interface. The apparatus may further include a determining unit, configured to determine a start location based on the initial coordinate location, a size of the projection interface, and resolution of the second terminal, where the start location may be a coordinate location relative to a first corner of the display of the second terminal. The display unit is specifically configured to display the second cursor at the start location.

In another possible implementation, the receiving unit is specifically configured to receive a first operation parameter from the first terminal, where the first operation parameter is an operation parameter in a first input event received by the first terminal in a process in which the user inputs, by using the input device of the first terminal, the first operation after the first cursor enters the projection interface, and the first operation parameter includes relative displacement of the first cursor relative to the initial coordinate location. The determining unit is further configured to determine relative displacement of the second cursor relative to the start location based on the relative displacement of the first cursor relative to the initial coordinate location. The apparatus may further include a simulation unit, configured to simulate the first input event based on the determined relative displacement of the second cursor relative to the start location and another parameter in the first operation parameter.

The display unit is further configured to display, on the display of the second terminal based on the first input event, an animation in which the second cursor moves.

In another possible implementation, the receiving unit is further configured to: when the second cursor moves to the first content of the first interface, receive a second operation input by the user by using the input device of the first terminal. The display unit is further configured to display a second interface in response to the second operation. The projection unit is further configured to project and display the second interface on the first terminal, so that content of the projection interface of the first terminal after update is a mirror of content of the second interface.

In another possible implementation, the receiving unit is specifically configured to receive a second operation parameter from the first terminal, where the second operation parameter is an operation parameter included in a second input event intercepted by the first terminal after the user inputs, by using the input device of the first terminal, the second operation when the first cursor moves to the content that is of the projection interface and that corresponds to the first content. The simulation unit is configured to simulate the second input event based on the second operation parameter, where the second input event is used to display the second interface.

In another possible implementation, the receiving unit is further configured to receive first indication information from the first terminal, where the first indication information indicates that sharing starts.

In another possible implementation, the receiving unit is further configured to receive second indication information from the first terminal, where the second indication information indicates that sharing stops, and the second indication information is sent by the first terminal after the first terminal determines that the first cursor moves out of the projection interface.

According to a fifth aspect, an embodiment of this application provides an interface display apparatus. The apparatus may include a processor and a memory configured to store instructions that can be executed by the processor. When the processor is configured to execute the instructions, the interface display apparatus is enabled to implement the method according to any one of the first aspect or the possible implementations of the first aspect, or implement the method according to any one of the second aspect or the possible implementations of the second aspect.

According to a sixth aspect, an embodiment of this application provides a computer-readable storage medium. The computer-readable storage medium stores computer program instructions. When the computer program instructions are executed by an electronic device, the electronic device is enabled to implement the method according to any one of the first aspect or the possible implementations of the first aspect, or implement the method according to any one of the second aspect or the possible implementations of the second aspect.

According to a seventh aspect, an embodiment of this application provides an electronic device. The electronic device includes a display, one or more processors, and a memory. The display and the processor are coupled to the memory. The memory is configured to store computer program code, the computer program code includes computer instructions, and when the computer instructions are executed by the electronic device, the electronic device performs the method according to any one of the first aspect or the possible implementations of the first aspect, or the terminal performs the method according to any one of the second aspect or the possible implementations of the second aspect.

According to an eighth aspect, an embodiment of this application provides a computer program product, including computer readable code or a non-volatile computer-readable storage medium carrying computer readable code. When the computer readable code runs in an electronic device, a processor in the electronic device performs the method according to any one of the first aspect or the possible implementations of the first aspect, or performs the method according to any one of the second aspect or the possible implementations of the second aspect.

According to a ninth aspect, an embodiment of this application provides an interface display system. The interface display system may include a first terminal and a second terminal, and the first terminal is connected to the second terminal.

The second terminal is configured to display a first interface, and project and display the first interface on the first terminal, so that the first terminal displays a projection interface;

The first terminal is configured to: display the projection interface on a display of the first terminal, where content of the projection interface is a mirror of content of the first interface displayed on a display of the second terminal; and receive a first operation input by a user by using an input device of the first terminal, where the first operation is used to move a first cursor on the display of the first terminal.

When the first cursor moves to first content of the projection interface, a cursor style of the first cursor is a first style, and/or a display manner of the first content is changed from a first manner to a second manner; and when the first cursor moves to second content of the projection interface, the cursor style of the first cursor is a second style, and/or a display manner of the second content is changed from a third manner to a fourth manner.

In a possible implementation, the projection interface is displayed in a part of the display of the first terminal. The first terminal is further configured to display, on the display of the first terminal in response to the first operation, an animation in which the first cursor moves. The second terminal is further configured to: when the first cursor enters the projection interface, display a second cursor on the first interface; receive the first operation input by the user by using the input device of the first terminal, where the first operation is used to move the second cursor on the display of the second terminal; and when the second cursor moves to content that is of the first interface and that corresponds to the first content, display the second cursor in the first style, and send a cursor type of the first style to the first terminal. The first terminal is further configured to display the first cursor based on the cursor type of the first style. The second terminal is further configured to: when the second cursor moves to content that is of the first interface and that corresponds to the second content, display the second cursor in the second style, and send a cursor type of the second style to the first terminal. The first terminal is further configured to display the first cursor based on the cursor type of the second style.

In another possible implementation, the second terminal is further configured to: when the second cursor moves to the content that is of the first interface and that corresponds to the first content, change a display manner of the content that is of the first interface and that corresponds to the first content from the first manner to the second manner. The first terminal is further configured to update the projection interface. The second terminal is further configured to: when the second cursor moves to the content that is of the first interface and that corresponds to the second content, change a display manner of the content that is of the first interface and that corresponds to the second content from the third manner to the fourth manner. The first terminal is further configured to update the projection interface.

It should be noted that, in this embodiment, the first corner may be any one of an upper left corner, a lower left corner, an upper right corner, and a lower right corner of the display.

It may be understood that, for beneficial effects that can be achieved by the interface display apparatus according to the third aspect and any possible implementation of the third aspect, the interface display apparatus according to the fourth aspect and any possible implementation of the fourth aspect, the interface display apparatus according to the fifth aspect, the computer-readable storage medium according to the sixth aspect, the terminal according to the seventh aspect, the computer program product according to the eighth aspect, and the interface display system according to the ninth aspect, refer to the beneficial effects in the first aspect, the second aspect, or any possible implementation of the second aspect. Details are not described herein.

BRIEF DESCRIPTION OF DRAWINGS

FIG. 11 is a schematic diagram of a cursor style according to an embodiment of this application;

DESCRIPTION OF EMBODIMENTS

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments of this application, unless otherwise specified, "a plurality of" means two or more than two.

Currently, to improve office efficiency, a user may connect a plurality of terminals for use together. For example, after two terminals are connected, collaborative office between the two terminals can be implemented through multi-screen collaboration. In multi-screen collaboration, an interface displayed on one terminal may be projected to a display of another terminal for display through screen mirroring. In embodiments, a terminal that projects a display interface of the terminal may be referred to as a projection source end, and a terminal that receives projection of the projection source end and displays the display interface of the projection source end may be referred to as a projection destination end. The interface that is projected by the projection source end and that is displayed on the projection destination end is referred to as a projection interface, and a window that is used by the projection target end to display the projection interface is referred to as a projection window.

Figure 1A:
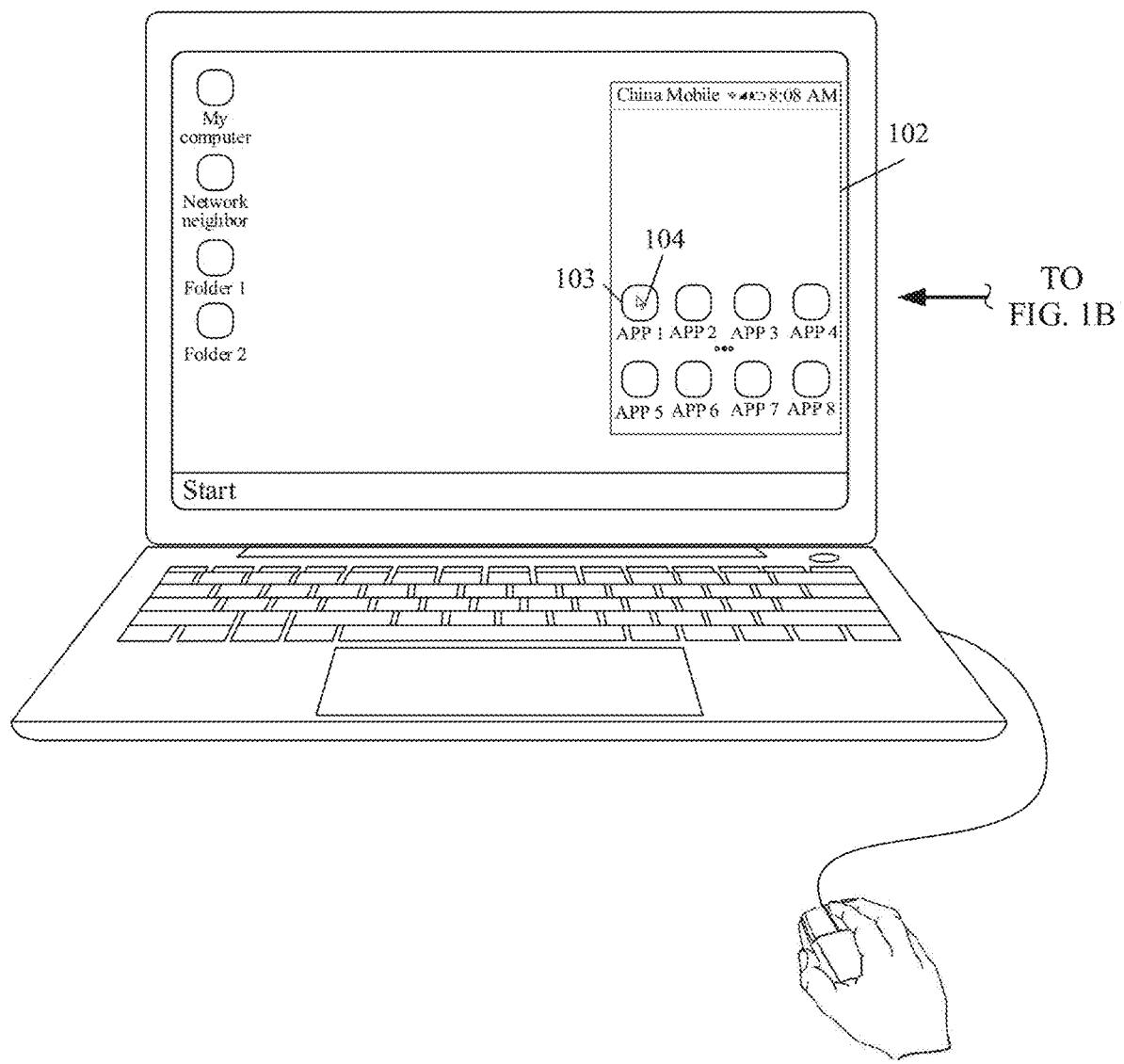
FIG. 1A and FIG. 1B are a schematic diagram of a display interface according to an embodiment of this application.
Figure 1B:
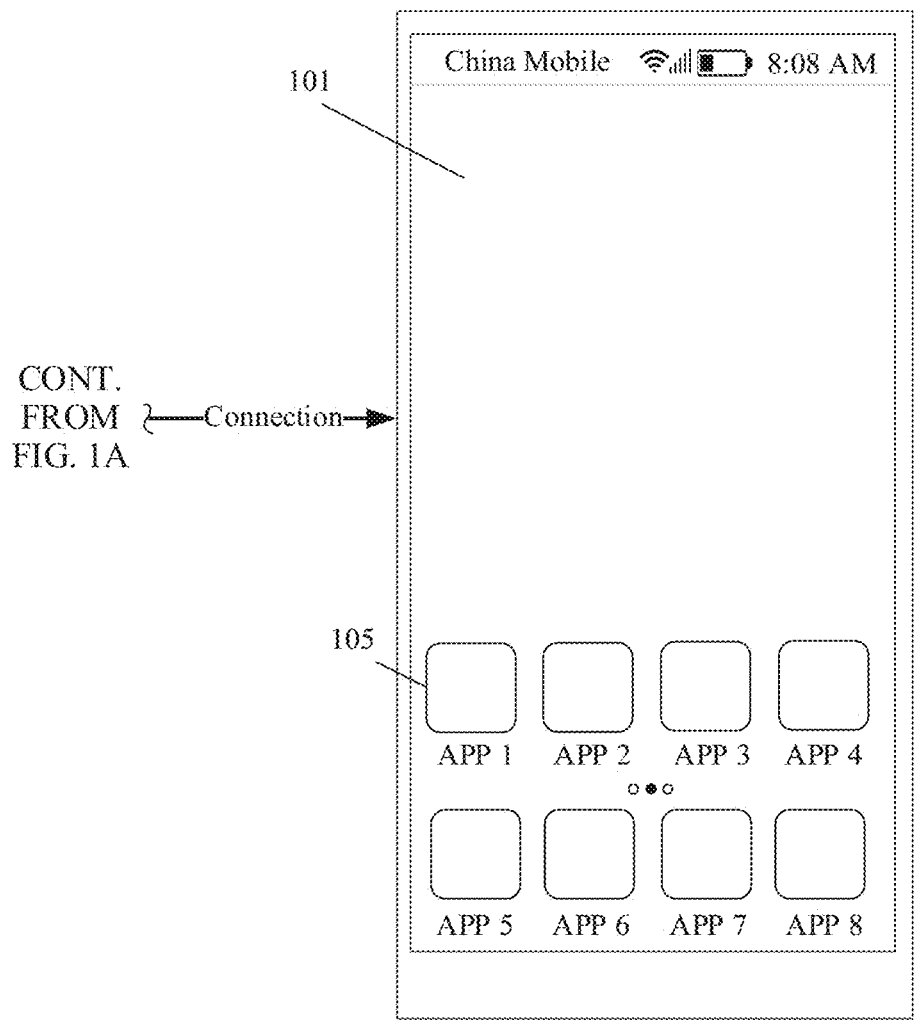

For example, with reference to FIG. 1A and FIG. 1B, a projection source end is a mobile phone and a projection destination end is a PC. The mobile phone may project an interface (for example, a home screen 101) displayed on a display of the mobile phone to a display of the PC. The PC may display, on the display of the PC, the interface projected by the mobile phone. For example, the PC displays a projection interface 102 in a projection window. Then, a user may perform an operation on the projection interface by using an input device of the projection destination end, to implement an operation for an actual interface of the projection source end. For example, still with reference to FIG. 1A and FIG. 1B, the input device is a mouse. The user may perform a mouse operation, for example, mouse click or mouse move on the projection interface 102 by using the mouse of the PC. After receiving the corresponding mouse operation, the PC may convert, based on a size ratio relationship between the projection interface 102 and an original interface (for example, the home screen 101) projected by the mobile phone, coordinates obtained when the user performs the mouse operation on the projection interface 102 into coordinates on the original interface of the mobile phone. The PC sends the converted coordinates and an operation type (for example, movement or click) to the mobile phone, so that the mobile phone can generate a corresponding touch event to perform simulation and operation on the actual operation interface (for example, the home screen 101), and project an interface displayed after the operation to the PC.

In addition, usually, for content, for example, a control, included in an original interface displayed on the PC, when the user operates the mouse to move a cursor to the control, in order to enable the user to visually know whether a next operation is performed on the control, the control and/or the cursor provide/provides corresponding visual feedback. For example, the control presents a highlighted background, or the cursor changes from a normal selection style to a text selection style. However, in the foregoing multi-screen collaboration scenario, when the user operates the input device, for example, the mouse, of the projection destination end (for example, the PC) to move the cursor to the control on the projection interface, the projection destination end usually does not provide visual feedback. For example, the control on the projection interface does not present the highlighted background, and the cursor style does not change accordingly. For example, still with reference to FIG. 1A and FIG. 1B, when the user operates the mouse of the PC to move the cursor to an icon 103 of an application (application, APP) 1 on the projection interface 102, the icon 103 does not provide visual feedback (for example, does not present the highlighted background). The cursor 104 is always in the normal selection style and does not change. This is not very friendly to the user, and the user cannot visually know whether the next operation can be performed on an icon 105 that corresponds to the icon 103 and that is displayed on the mobile phone.

An embodiment of this application provides an interface display method. The method may be applied to a scenario in which a projection source end projects an interface displayed on a display of the projection source end to a display of a projection destination end for display when a plurality of terminals are used in collaboration. According to the method provided in this embodiment, when a user operates an input device, for example, a mouse or a touchpad, of the projection destination end to move a cursor to content of a projection interface, the content and/or the cursor on the projection interface provide/provides corresponding visual feedback, for example, the content of the projection interface presents a highlighted background, and a cursor style changes accordingly. In this way, the user can visually determine whether a next operation can be performed on content that corresponds to the content of the projection interface and that is displayed on the projection source end, thereby improving use experience.

It should be noted that the cursor in this embodiment may also be referred to as a mouse pointer. The cursor may be an image, which may be dynamic or static, and the cursor style may also be different in different cases. The content in this embodiment may be an operable element displayed in the interface, for example, a control, or may be an inoperable element displayed in the interface. An element may include one or more of the following content: a character, a button, an icon, and the like.

The following describes the implementations of embodiments of this application in detail with reference to accompanying drawings.

Figure 2:
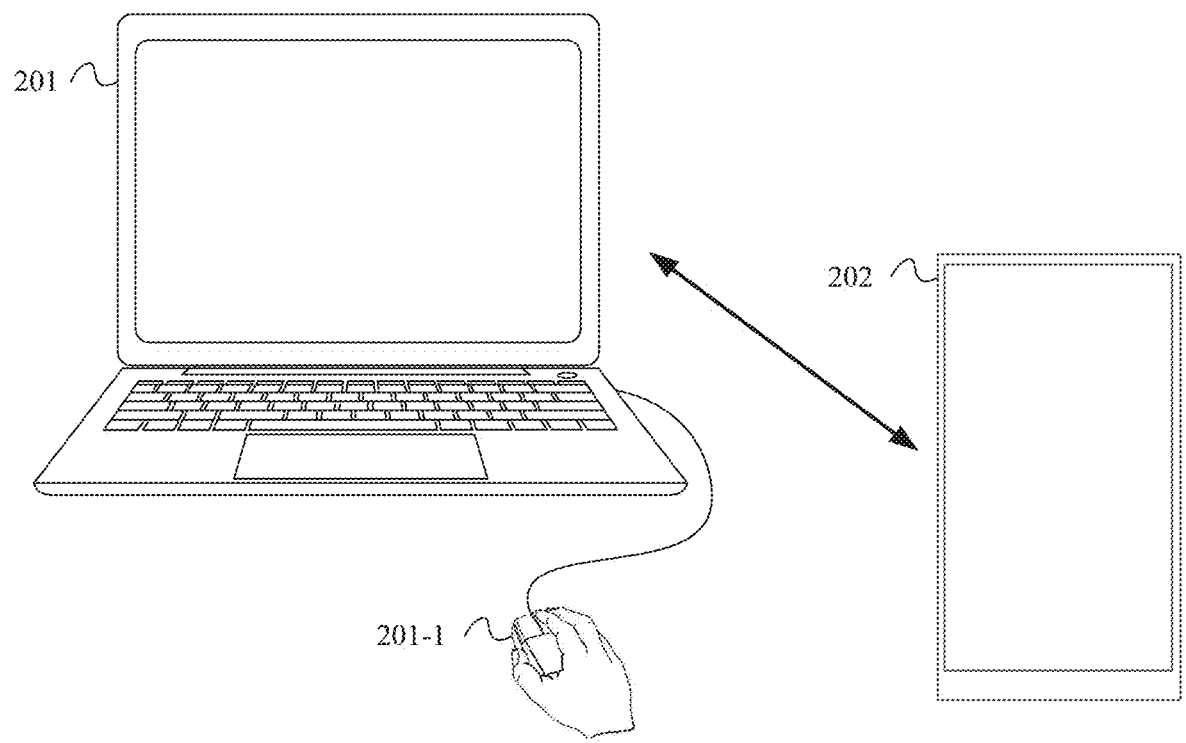
FIG. 2 is a simplified schematic diagram of a system architecture according to an embodiment of this application.

FIG. 2 is a simplified schematic diagram of a system architecture to which the method may be applied according to an embodiment of this application. As shown in FIG. 2, the system architecture may include at least a first terminal 201 and a second terminal 202.

The first terminal 201 is connected to an input device 201-1 (as shown in FIG. 2), or includes an input device 201-1 (not shown in FIG. 2). In an example, the input device 201-1 may be a mouse, a touchpad, or the like. In FIG. 2, for example, the input device 201-1 is a mouse.

In this embodiment, the first terminal 201 and the second terminal 202 may establish a connection in a wired or wireless manner. The first terminal 201 and the second terminal 202 may be cooperatively used together based on the established connection. In this embodiment, a wireless communication protocol used when the first terminal 201 and the second terminal 202 establish the connection in a wireless manner may be a wireless fidelity (wireless fidelity, Wi-Fi) protocol, a Bluetooth (Bluetooth) protocol, a ZigBee protocol, a near field communication (Near Field Communication, NFC) protocol, various cellular network protocols, or the like. This is not specifically limited herein.

After the first terminal 201 is connected to the second terminal 202, a projection source end in the first terminal 201 and the second terminal 202 may project an interface displayed on a display of the projection source end to a display of a projection destination end for display. For example, the first terminal 201 is used as the projection destination end, and the second terminal 202 is used as the projection source end. The second terminal 202 may project an interface displayed on a display of the second terminal 202 to a display of the first terminal 201 for display. Then, the user may perform, by using the input device 201-1 of the first terminal 201, an operation on a projection interface displayed on the display of the first terminal 201, to perform an operation on an actual interface displayed on the second terminal 202.

In this embodiment of this application, in a process in which the user performs the operation on the projection interface displayed on the display of the first terminal 201, when the user operates the input device 201-1, for example, the mouse or the touchpad, of the first terminal 201 to move a cursor on the display of the first terminal 201 to content, for example, a control, of the projection interface, the first terminal 201 may enable, by using a keyboard and mouse sharing technology, the control and/or the cursor on the projection interface to provide corresponding visual feedback. For example, the control on the projection interface presents the highlighted background, and the cursor style changes accordingly, so that the user can visually know whether a next operation can be performed on a control that corresponds to the control on the projection interface and that is displayed on the second terminal 202.

It should be noted that the terminal in this embodiment of this application, for example, the first terminal 201 or the second terminal 202, may be a mobile phone, a tablet computer, a handheld computer, a PC, a cellular phone, a personal digital assistant (personal digital assistant, PDA), a wearable device (for example, a smartwatch), a vehicle-mounted computer, a game console, an augmented reality (augmented reality, AR)/virtual reality (virtual reality, VR) device, or the like. A specific form of the terminal is not specially limited in this embodiment. In FIG. 2, for example, the first terminal 201 is a PC, and the second terminal 202 is a mobile phone. In addition, in addition to the foregoing terminal (or a mobile terminal), the technical solutions provided in this embodiment may also be applied to another electronic device, for example, a smart home device (for example, a television).

Figure 3:
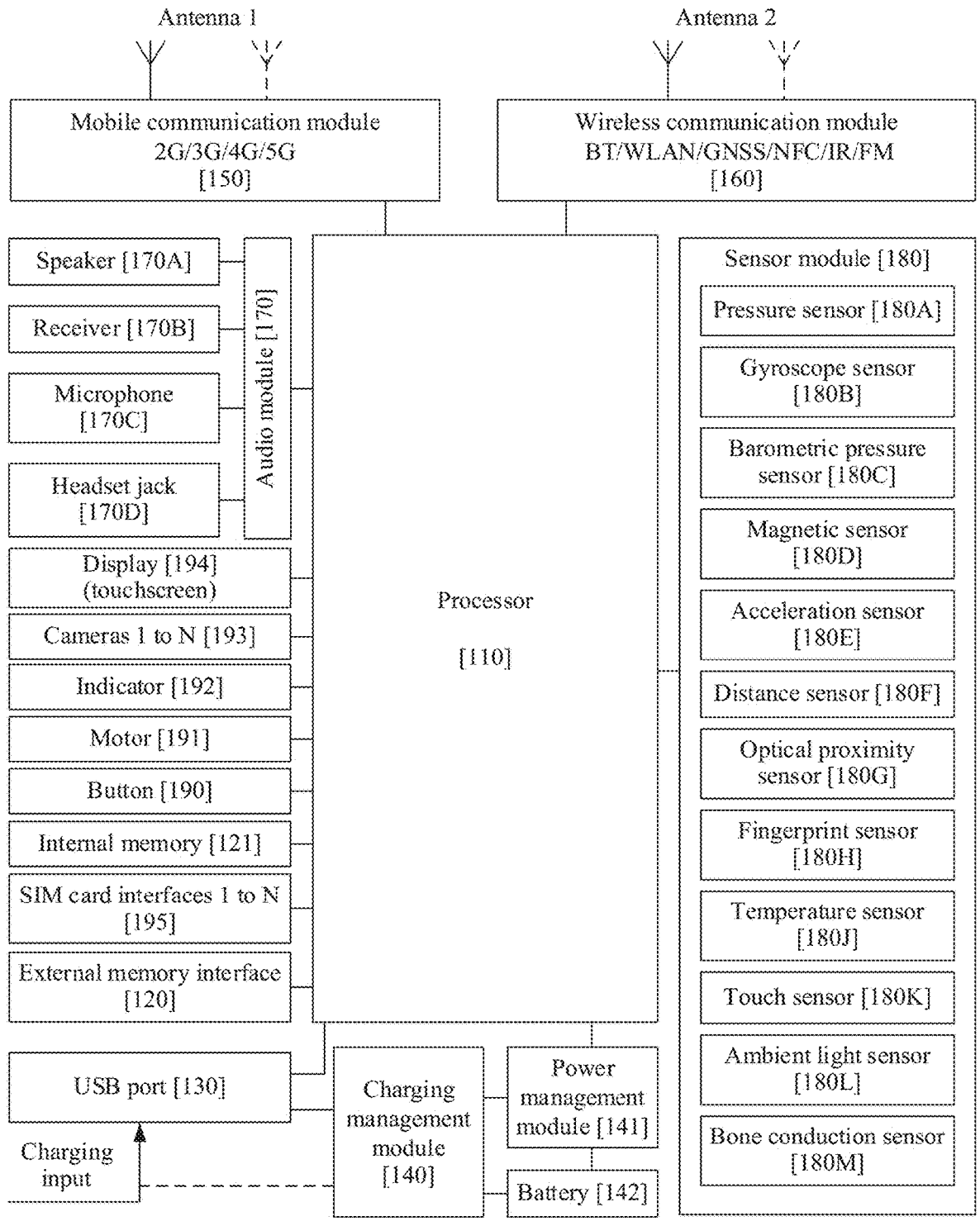
FIG. 3 is a schematic diagram of a structure of a mobile phone according to an embodiment of this application.

In this embodiment, for example, the terminal is a mobile phone. FIG. 3 is a schematic diagram of a structure of a mobile phone according to an embodiment of this application. Methods in the following embodiments may be implemented in a mobile phone having the foregoing hardware structure.

As shown in FIG. 3, the mobile phone may include a processor 110, an external memory interface 120, an internal memory 121, a universal serial bus (universal serial bus, USB) port 130, a charging management module 140, a power management module 141, a battery 142, an antenna 1, an antenna 2, a wireless communication module 160, an audio module 170, a speaker 170A, a receiver 170B, a microphone 170C, a headset jack 170D, a sensor module 180, a button 190, a motor 191, an indicator 192, a camera 193, a display 194, and the like. Optionally, the mobile phone may further include a mobile communication module 150, a subscriber identification module (subscriber identification module, SIM) card interface 195, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment constitutes no specific limitation on the mobile phone. In some other embodiments, the mobile phone may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate devices, or may be integrated into one or more processors.

The controller may be a nerve center and a command center of the mobile phone. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access and reduces waiting time of the processor 110, so that system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM interface, a USB interface, and/or the like.

The charging management module 140 is configured to receive a charging input from the charger. The charging management module 140 may further supply power to the mobile phone by using the power management module 141 while charging the battery 142. The power management module 141 is configured to connect to the battery 142, the charging management module 140, and the processor 110. The power management module 141 may also receive an input of the battery 142 to supply power to the mobile phone.

A wireless communication function of the mobile phone may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the mobile phone may be configured to cover one or more communication frequency bands Different antennas may be further multiplexed, to improve antenna utilization. For example, the antenna 1 may be multiplexed as a diversity antenna of a wireless local area network. In other embodiments, the antenna may be used in combination with a tuning switch.

When the mobile phone includes the mobile communication module 150, the mobile communication module 150 may provide a solution that includes wireless communication such as 2G, 3G, 4G, and 5G and that is applied to the mobile phone. The mobile communication module 150 may include at least one filter, a snitch, a power amplifier, a low noise amplifier (low noise amplifier. LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communication module 150 or another functional module.

The wireless communication module 160 may provide a solution that includes wireless communication such as a wireless local area network (wireless local area network, WLAN) (for example, a Wi-Fi network), Bluetooth (Bluetooth, BT), a global navigation satellite system (global navigation satellite system, GNSS), frequency modulation (frequency modulation, FM), NFC, and an infrared (infrared, IR) technology and that is applied to the mobile phone. The wireless communication module 160 may be one or more components integrating at least one communication processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the mobile phone, the antenna 1 and the mobile communication module 150 are coupled, and the antenna 2 and the wireless communication module 160 are coupled, so that the mobile phone can communicate with a network and another device by using a wireless communication technology. The wireless communication technology may include a global system for mobile communications (global system for mobile communications. GSM), a general packet radio service (general packet radio service, GPRS), code division multiple access (code division multiple access, CDMA), wideband code division multiple access (wideband code division multiple access, WCDMA), time division code division multiple access (time-division code division multiple access. TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems. SBAS).

The mobile phone implements a display function by using the GPU, the display 194, the application processor, and the like. The GPU is a microprocessor for image processing, and is connected to the display 194 and the application processor. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flexible light-emitting diode, FLED), a mini-LED, a micro-LED, a micro-OLED, a quantum dot light-emitting diode (quantum dot light emitting diode, QLED), or the like. In some embodiments, the mobile phone may include one or N displays 194, where N is a positive integer greater than 1.

The mobile phone may implement a photographing function by using the ISP, a camera 193, the video codec, the GPU, the display 194, the application processor, and the like. In some embodiments, the mobile phone may include one or N cameras 193, where N is a positive integer greater than 1.

The external memory interface 120 may be configured to connect to an external memory card, for example, a micro SD card, to extend a storage capability of the mobile phone. The external memory card communicates with the processor 110 through the external memory interface 120, to implement a data storage function. For example, files such as music and videos are stored in the external storage card.

The internal memory 121 may be configured to store computer executable program code. The executable program code includes instructions. The processor 110 runs the instructions stored in the internal memory 121, to perform various function applications of the mobile phone and data processing. The internal memory 121 may include a program storage area and a data storage area. The program storage area may store an operating system, an application required by at least one function (for example, a sound playing function or an image playing function), and the like. The data storage region may store data (for example, audio data or a phone book) created when the mobile phone is used, and the like. In addition, the internal memory 121 may include a high-speed random access memory, or may include a nonvolatile memory such as at least one disk storage device, a flash memory, or a universal flash storage (universal flash storage, UFS).

The mobile phone may implement an audio function by using the audio module 170, the speaker 170A, the receiver 170B, the microphone 170C, the headset jack 170D, the application processor, and the like, and the like.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. When a touch operation is performed on the display 194, the mobile phone detects intensity of the touch operation by using the pressure sensor 180A. The mobile phone may also calculate a touch location based on a detection signal of the pressure sensor 180A.

The gyro sensor 180B may be configured to determine a motion posture of the mobile phone. The barometric pressure sensor 180C is configured to measure barometric pressure. The magnetic sensor 180D includes a Hall sensor. The mobile phone may detect opening and closing of a flip cover by using the magnetic sensor 180D. The acceleration sensor 180E may detect magnitude of accelerations of the mobile phone in various directions (generally on three axes). The distance sensor 180F is configured to measure a distance. The mobile phone may detect, by using the optical proximity sensor 180G, that a user holds the mobile phone close to an ear to make a call, to automatically turn off a screen for power saving. The optical proximity sensor 180G may also be used in a smart cover mode or a pocket mode to automatically perform screen unlocking or locking. The ambient light sensor 180L is configured to sense ambient light brightness. The fingerprint sensor 180H is configured to collect a fingerprint. The mobile phone may use a feature of the collected fingerprint to implement fingerprint-based unlocking, application lock access, fingerprint-based photographing, fingerprint-based call answering, and the like. The temperature sensor 180J is configured to detect a temperature.

The touch sensor 180K is also referred to as a touch panel. The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided on the display 194. In some other embodiments, the touch sensor 180K may be alternatively disposed on a surface of the mobile phone and is at a location different from that of the display 194.

The bone conduction sensor 180M may obtain a vibration signal. The button 190 includes a power button, a volume button, and the like. The button 190 may be a mechanical button, or may be a touch button. The motor 191 may generate a vibration prompt. The motor 191 may be configured to provide an incoming call vibration prompt and a touch vibration feedback. The indicator 192 may bean indicator light, and may be configured to indicate a charging status and a power change, or may be configured to indicate a message, a missed call, a notification, and the like.

When the mobile phone includes the SIM card interface 195, the SIM card interface 195 is configured to connect to a SIM card. The SIM card may be inserted into the SIM card interface 195 or removed from the SIM card interface 195, to implement contact with or separation from the mobile phone. The mobile phone may support one or N SIM card interfaces, where N is a positive integer greater than 1. The mobile phone interacts with a network by using the SIM card, to implement functions such as calling and data communication. In some embodiments, the mobile phone uses an eSIM, namely, an embedded SIM card. The eSIM card may be embedded in the mobile phone, and cannot be separated from the mobile phone.

Figure 4:
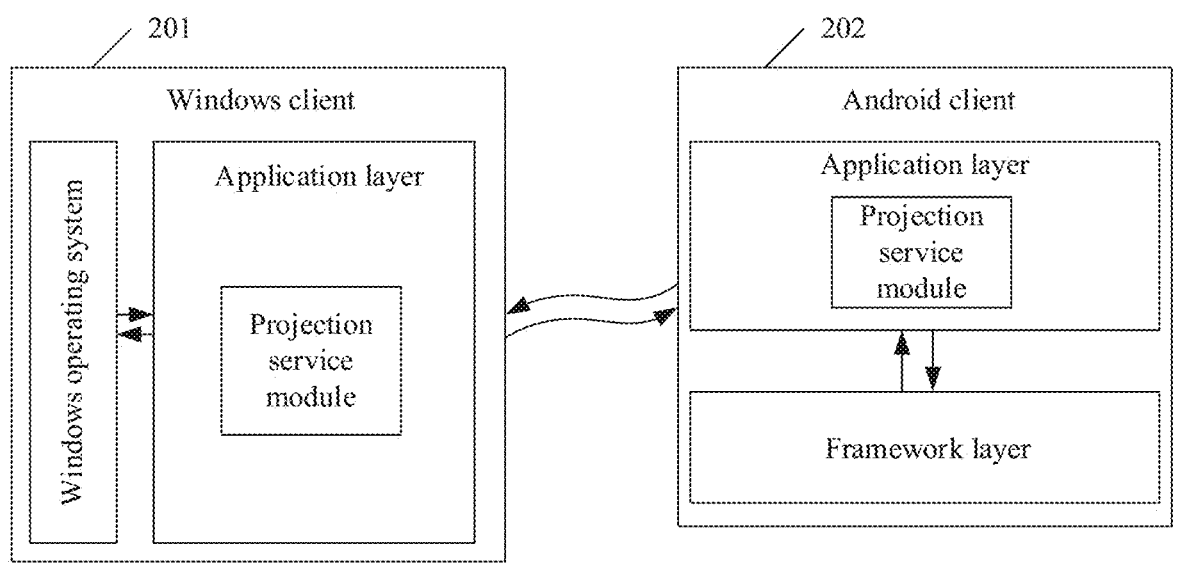
FIG. 4 is a schematic diagram of a software architecture according to an embodiment of this application.

With reference to FIG. 2, in this embodiment of this application, software structures of the first terminal 201 and the second terminal 202 are described by using an example in which the software system of the first terminal 201 is a Windows system and the software system of the second terminal 202 is an Android system FIG. 4 is a schematic diagram of a composition of a software architecture according to this embodiment of this application.

As shown in FIG. 4, the software architecture of the first terminal 201 may include an application laver and a Windows system (Windows shell). In some embodiments, the application layer may include applications installed on the first terminal 201. The applications at the application layer can directly interact with the Windows system. For example, the application layer may further include a projection service module.

The software system of the second terminal 202 may use a layered architecture, an event-driven architecture, a microkernel architecture, a microservice architecture, or a cloud architecture. For example, the software system of the second terminal 202 is a layered architecture. In a layered architecture, software is divided into several layers, and each layer has a clear role and task. The layers communicate with each other through a software interface. In some embodiments, as shown in FIG. 4, the second terminal 202 may include an application layer and a framework (framework, FWK) layer. The application layer may include a series of application packages. For example, the application packages may include applications such as Settings, Calculator, Camera, Messages, and Music player. An application included in the application layer may be a system application of the second terminal 202, or may be a third-party application. This is not specifically limited in this embodiment of this application. The application layer may further include a projection service module. The framework layer is mainly responsible for providing an application programming interface (application programming interface, API) and a programming framework for an application at the application layer. Certainly, the second terminal 202 may further include another layer, for example, a kernel layer (not shown in FIG. 4). The kernel layer is a layer between hardware and software. The kernel layer includes at least a display driver, a camera driver, an audio driver, a sensor driver, and the like.

In this embodiment of this application, for example, the first terminal 201 is used as a projection destination end and the second terminal 202 is used as a projection source end. After the second terminal 202 projects an interface displayed on a display of the second terminal 202 to a display of the first terminal 201 for display, if a user operates an input device 201-1 of the first terminal 201, for example, a mouse or a touchpad, to move a cursor on the display of the first terminal 201 to content, for example, a control, of a projection interface, when a control that corresponds to the control and that is displayed on the second terminal 202 is operable, the first terminal 201 may enable, based on the foregoing software architecture and by using a keyboard and mouse sharing technology, the control and/or the cursor on the projection interface to provide corresponding visual feedback. For example, the control presents a highlighted background, and a style of the cursor changes accordingly. In this way, the user can visually know whether a next operation can be performed on the control that corresponds to the control on the projection interface and that is displayed on the second terminal 202. The keyboard and mouse sharing technology may be a technology of controlling another terminal by using an input device (for example, a mouse or a touchpad) of a terminal.

With reference to FIG. 2 and FIG. 4, the following describes in detail a user interface display method provided in an embodiment of this application with reference to the accompanying drawings by using an example in which the first terminal 201 is a PC, the second terminal 202 is a mobile phone, and the input device 202-1 is a mouse.

Figure 5:
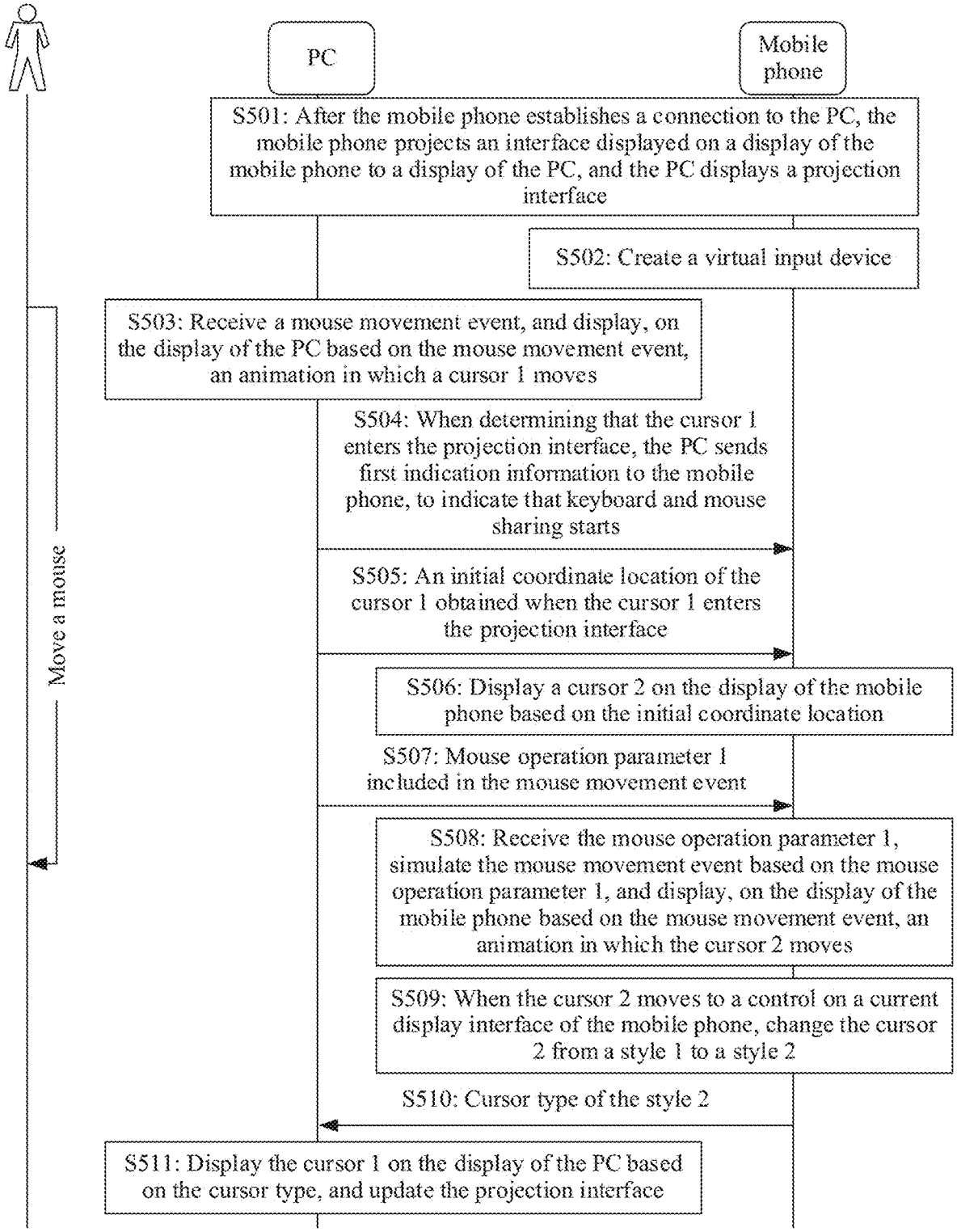
FIG. 5 is a schematic flowchart of an interface display method according to an embodiment of this application.

FIG. 5 is a schematic flowchart of an interface display method according to an embodiment of this application. As shown in FIG. 5, the method may include S501 to S511.

S501: After a mobile phone establishes a connection to a PC, the mobile phone projects an interface displayed on a display of the mobile phone to a display of the PC, and the PC displays a projection interface.

When a user wants to use collaborative office provided by a plurality of terminals through multi-screen collaboration, after the plurality of terminals establish a connection, a terminal used as a projection source end may project an interface displayed on a display of the terminal to a display of a terminal used as a projection destination end for display. For example, the mobile phone is used as a projection source end, and the PC is used as a projection destination end. The mobile phone establishes the connection to the PC. Then, the mobile phone may project the interface displayed on the display of the mobile phone to the display of the PC. The PC may display the projection interface on the display of the PC.

The mobile phone may be establishes a connection to the PC in a plurality of manners. In some embodiments, the mobile phone and the PC may establish a connection in a wired manner. For example, the mobile phone may establish a wired connection to the PC by using a data cable.

In some other embodiments, the mobile phone and the PC may establish a connection in a wireless manner. There are two requirements for establishing a connection between terminals in a wireless manner. One requirement is that the terminals know connection information of each other, and the other requirement is that each terminal has a transmission capability. The connection information may be a device identifier of the terminal, for example, an internet protocol (internet protocol, IP) address, a port number, or an account logged in on the terminal. The account logged in on the terminal may be an account provided by an operator for the user, for example, a Huawei account. The account logged in on the terminal may alternatively be an application account, for example, a WeChat® account or a Youku® account. The transmission capability of the terminal may be a near-field communication capability, or may be a long-distance communication capability. In other words, a wireless communication protocol used to establish a connection between terminals, for example, the mobile phone and the PC, may be a near-field communication protocol such as a Wi-Fi protocol, a Bluetooth protocol, or an NFC protocol, or may be a cellular network protocol. For example, the user may use the mobile phone to touch an NFC tag of the PC, and the mobile phone reads connection information stored in the NFC tag. For example, the connection information includes an IP address of the PC. Then, the mobile phone may establish a connection to the PC by using the NFC protocol based on the IP address of the PC. For another example. Bluetooth functions and Wi-Fi functions of the mobile phone and the PC are enabled. The PC may broadcast a Bluetooth signal to discover a surrounding terminal. For example, the PC may display a list of discovered devices, where the list of discovered devices may include an identifier of a mobile phone discovered by the PC. In addition, the PC may exchange connection information, such as IP addresses, with the discovered device during device discovery. Then, after the PC receives an operation of selecting the identifier of the mobile phone from the displayed device list by the user, the PC may establish a connection to the mobile phone by using the Wi-Fi protocol based on the IP address of the mobile phone. For another example, both the mobile phone and the PC are connected to a cellular network, and a same Huawei account is logged in on the mobile phone and the PC. The mobile phone and the PC may establish a connection based on the Huawei account and the cellular network.

For example, with reference to FIG. 2, in this embodiment, the mobile phone establishes a connection to the PC in a wireless manner. In a scenario in which the user uses collaborative office provided by the mobile phone and the PC through multi-screen collaboration, the user may manually enable a projection service function of the PC. The projection service function of the PC may be alternatively automatically enabled. For example, the function is automatically enabled when the PC is started. After the projection service function of the PC is enabled, the projection service module at an application layer of the PC may start to perform network monitoring, to monitor whether a terminal is connected to the PC. When the user wants to project a display interface of the mobile phone to the PC and uses collaborative office provided by the mobile phone and the PC, the user may turn on an NFC switch of the mobile phone, and touch the NFC tag of the PC by using the mobile phone. The mobile phone may read the IP address of the PC stored in the NFC tag. Then, the mobile phone and the PC separately display confirmation interfaces, to ask the user whether the user is sure to project the display interface of the mobile phone to the PC for display. After the user selects "Yes" in the confirmation interface, the PC, for example, a projection service module of the PC, may send a projection notification message to the mobile phone (for example, a projection service module in the mobile phone). After receiving the projection notification message, the mobile phone may establish the connection to the PC based on the obtained IP address of the PC.

Figure 6A:
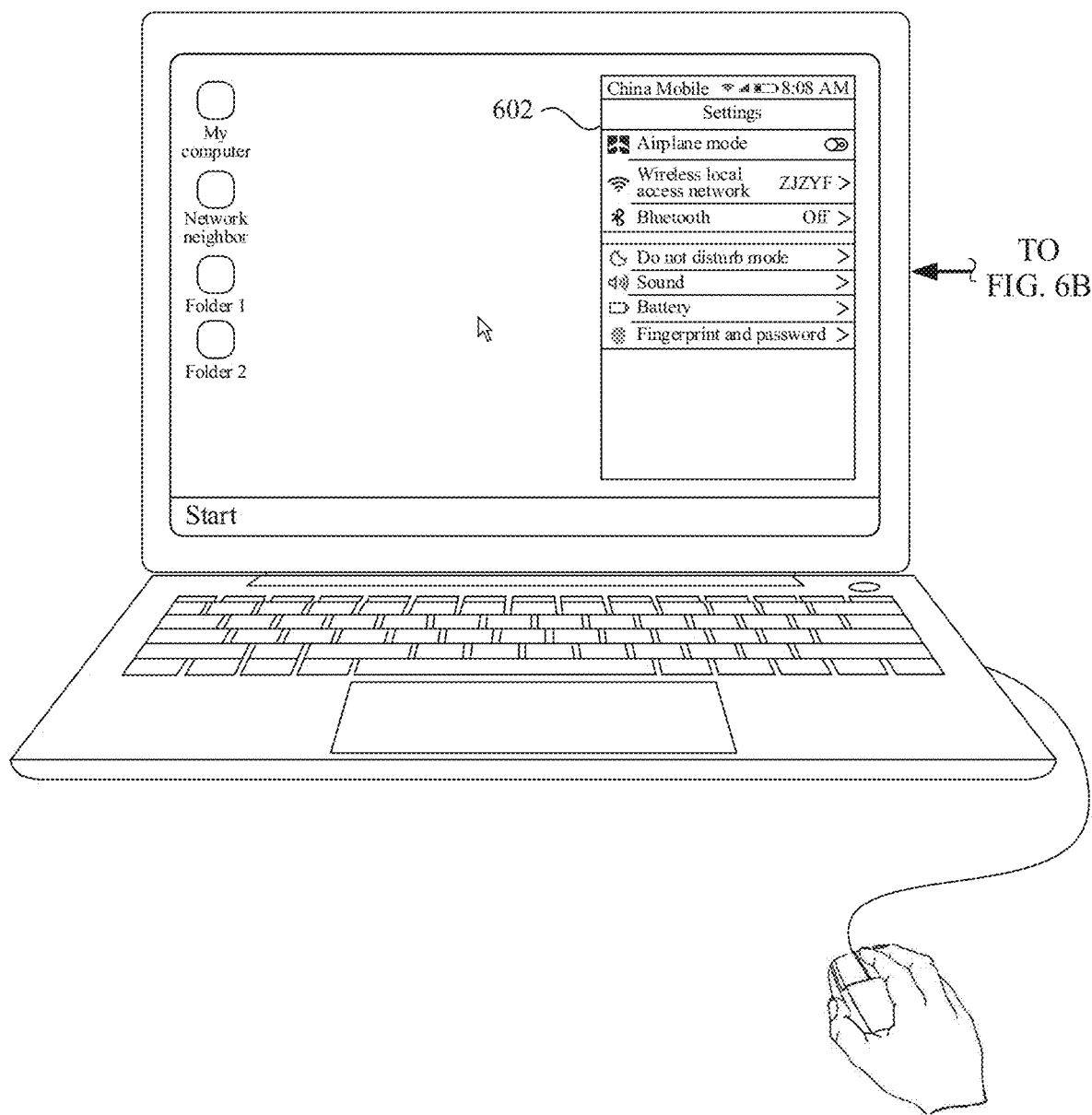
FIG. 6A and FIG. 6B are a schematic diagram of another display interface according to an embodiment of this application.
Figure 6B:
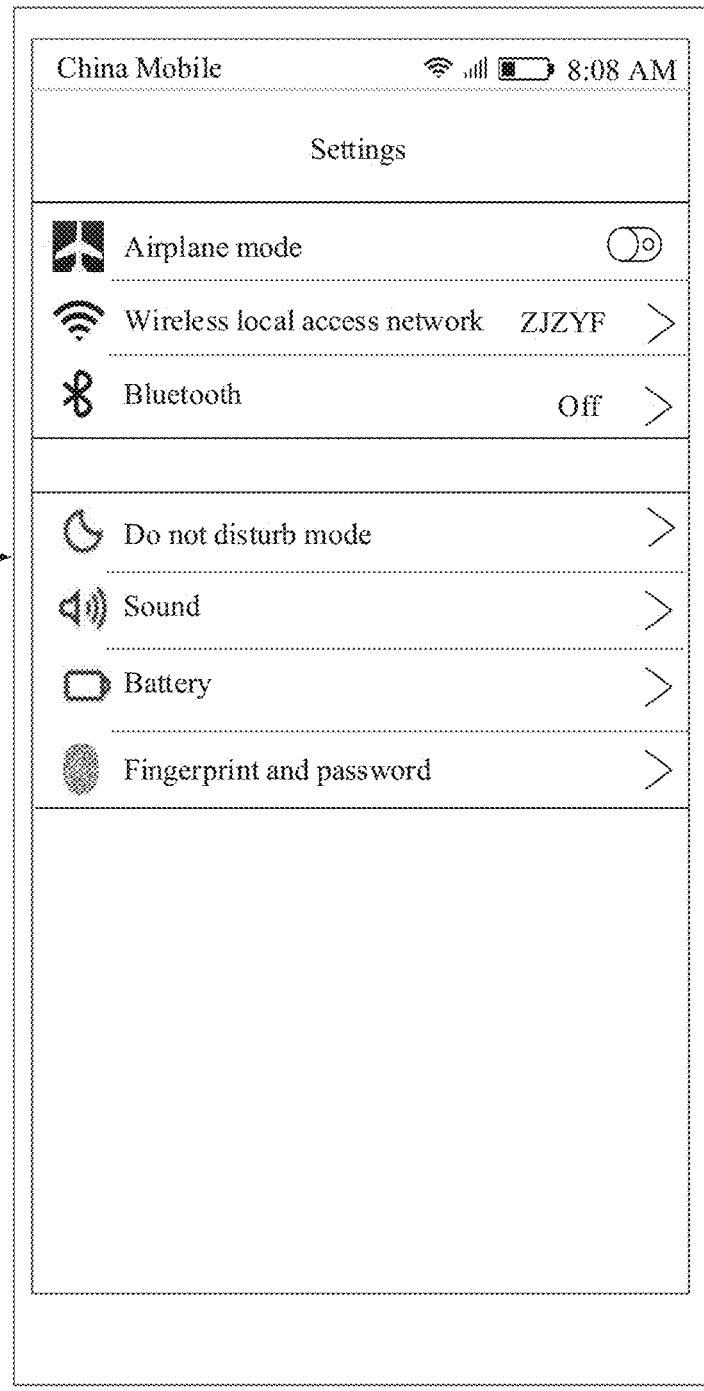

After the connection is successfully established, the mobile phone used as the projection source end may project the interface displayed on the display of the mobile phone to the display of the PC used as the projection destination end. The PC displays the projection interface. Content displayed on the projection interface is the same as content of an interface (for example, a first interface) displayed on the display of the mobile phone, or content of the projection interface is a mirror of content of an interface displayed on the display of the mobile phone. For example, as shown in FIG. 6A and FIG. 6B, a setting interface 601 is currently displayed on the display of the mobile phone. After the connection between the mobile phone and the PC is successfully established, the mobile phone may project the setting interface 601 to the display of the PC. The PC displays a projection interface 602. It can be seen that content of the projection interface 602 is the same as content in the setting interface 601.

A window used by the PC to display the projection interface may be referred to as a projection window. For example, with reference to FIG. 2, before the mobile phone projects the interface displayed on the display of the mobile phone to the display of the PC, the projection service module at the application layer of the PC may display the projection window. For example, the projection service module of the PC may display the projection window after the projection service function of the PC is enabled, or after the projection service function of the PC is enabled and the connection to the another terminal (for example, the mobile phone) is successfully established. The PC may display the projection window on the entire display of the PC. That is, the projection window occupies the entire display of the PC. The PC may alternatively display the projection window in a part of the display of the PC. That is, the projection interface in the projection window is only a part of an interface on the display of the PC. This is not specifically limited in this embodiment.

In this embodiment, a specific implementation in which the mobile phone projects the interface displayed on the display of the mobile phone to the display of the PC for display may be as follows: The mobile phone, for example, the projection service module in the mobile phone, may obtain data corresponding to the current display interface of the mobile phone, and send the data to the PC. After receiving the data, the PC may display the projection interface in the projection window on the display of the PC based on the data. For example, the projection service module in the mobile phone may obtain, by using a display manager (for example, the display manager is a module at the framework layer of the mobile phone) of the mobile phone, the data corresponding to the current display interface of the mobile phone, for example, screen recording data, and send the data to the PC, to project the display interface of the mobile phone to the display of the PC for display.

In some embodiments, a distributed multimedia protocol (Distributed Multimedia Protocol, DMP) may be used to implement projection and display from the display interface of the mobile phone to the display of the PC. For example, after the mobile phone receives a projection notification message from the PC, the projection service module of the mobile phone may create a virtual display (Virtual Display) by using a display manager (Display Manager) of the mobile phone. For example, the projection service module of the mobile phone sends, to the display manager of the mobile phone, a request for creating the virtual display. After completing creating the virtual display, the display manager of the mobile phone may return the created virtual display to the projection service module of the mobile phone. The, the projection service module of the mobile phone may move drawing of the interface displayed on the display of the mobile phone to the virtual display. In this way, the projection service module of the mobile phone can obtain screen recording data. After obtaining the screen recording data, the projection service module of the mobile phone may encode the screen recording data, and then send encoded screen recording data to the PC. The projection service module of the PC may receive the corresponding data, and obtain the screen recording data after decoding the data. Then, the projection service module of the PC cooperates with the framework layer of the PC to draw a corresponding interface based on the screen recording data and display the corresponding interface in the projection window. For example, the framework layer of the PC may provide a surfaceview to implement projection and display of the projection interface on the PC end.

In some other embodiments, wireless projection (Miracast) may be alternatively used to project the display interface of the mobile phone onto the display of the PC for display. To be specific, the mobile phone may obtain all layers of the display interface of the mobile phone, then integrate all the obtained layers into a video stream (or referred to as screen recording data), encode the video stream, and then send encoded video stream to the PC by using a real time streaming protocol (real time streaming protocol, RTSP). After receiving the video stream, the PC may decode and play the video stream, to implement projection and display of the display interface of the mobile phone on the display of the PC. Alternatively, the mobile phone may extract an instruction from the display interface of the mobile phone to obtain an instruction stream, obtain layer information and the like of the display interface of the mobile phone, and then send the instruction stream, the layer information, and the like to the PC, so that the PC restores the interface displayed on the display of the mobile phone, to implement projection and display of the display interface of the mobile phone on the PC.

S502: The mobile phone creates a virtual input device.

In this embodiment, the mobile phone used as the projection source end may further create the virtual input device, so that when performing, by using the projection destination end, for example, an input device (for example, a mouse) of the PC, an operation on the projection interface displayed on the PC, the user can simulate a corresponding input event on the mobile phone. The mobile phone correspondingly responds to the obtained input event through simulation, so that the input device of the PC can control the mobile phone. In other words, the user cannot only control the projection destination end, but also control the projection source end by using the input device of the projection destination end. This implements keyboard and mouse sharing between the projection destination end and the projection source end.

As an example of implementation, when a keyboard and mouse sharing mode of the PC is enabled, keyboard and mouse sharing between the PC and the mobile phone may be implemented, that is, the user may control the PC and the mobile phone by using the input device of the PC.

For example, in some embodiments, after another terminal successfully establishes a connection to the PC, the PC may display a pop-up window. The pop-up window is used to ask the user whether to enable the keyboard and mouse sharing mode. If an operation of selecting, by the user, to enable the keyboard and mouse sharing mode is received, the PC may enable the keyboard and mouse sharing mode.

After enabling the keyboard and mouse sharing mode, the PC may notify all terminals that have established connections to the PC, or a terminal that has established a connection to the PC and that has projected an interface to the PC, that the keyboard and mouse sharing mode is enabled. If the PC establishes a connection to the mobile phone, and the mobile phone projects the interface to the PC, the PC notifies the mobile phone that the keyboard and mouse sharing mode is enabled. For example, the PC may send a notification message to the mobile phone, and the notification message may indicate that the keyboard and mouse sharing mode of the PC is enabled. After receiving the notification, the mobile phone may create the virtual input device. The virtual input device has a same function as a conventional input device, for example, a mouse or a touchpad, and may be used by the mobile phone to simulate a corresponding input event. For example, the input device is a mouse. The virtual input device created by the mobile phone has a same function as a conventional mouse, may be considered as a mouse shared by the PC with the mobile phone, and can be used to simulate a mouse event on the mobile phone, to implement control of the mouse of the PC on the mobile phone. For example, an operating system of the mobile phone is an Android system. The mobile phone may use a uinput capability of Linux to create the virtual input device. Herein, uinput is a kernel layer module, and may simulate an input device. By writing /dev/uinput (or /dev/input/uinput) to a device, a process may create a virtual input device with a specific function. Once the virtual input device is created, the virtual input device may simulate a corresponding event. Similarly, the another terminal that establishes the connection to the PC also creates a virtual input device based on a received notification. It should be noted that, if an operating system of the terminal that receives the notification is an Android system, the virtual input device may be created by using a uinput capability of Linux, or the virtual input device may be created by using a human interface device (human interface device, HID) protocol. If an operating system of the terminal that receives the notification is another operating system, for example, an iOS system or a Windows system, the virtual input device may be created by using an HID protocol. In addition, in the foregoing embodiment, an example in which the terminal creates the virtual input device after receiving the notification used to notify that the keyboard and mouse sharing mode of the PC is enabled is used for description. In some other embodiments, after receiving the notification, the terminal may alternatively display a pop-up window to ask the user whether the user wants to use the input device of the PC to control this device. If an operation of selecting, by the user, to use the input device of the PC to control this device is received, the virtual input device is created. Otherwise, the virtual input device is not created.

For another example, in some other embodiments, the PC may automatically enable the keyboard and mouse sharing mode by default after another terminal, for example, a mobile phone, establishes a connection to the PC, and the user does not need to manually enable the keyboard and mouse sharing mode. For example, after another terminal, for example, the mobile phone, establishes a connection to the PC, and may also automatically create a virtual input device, and the PC does not need to send a notification. Alternatively, after establishing a connection to the PC, another terminal may first display a pop-up window to ask the user whether the user wants to use the input device of the PC to control this device. Then, if an operation of selecting, by the user, to use the input device of the PC to control this device is received, a virtual input device is automatically created. Otherwise, a virtual input device is not created. Alternatively, the PC automatically enables the keyboard and mouse sharing mode by default after an interface of the terminal used as a projection source end is projected to the PC used as the projection destination end, and the user does not need to manually enable the keyboard and mouse sharing mode. The terminal used as the projection source may also create a virtual input device after the interface is projected to the PC or after receiving a projection notification message from the PC.

In addition, with reference to FIG. 2, because the mouse is the input device of the PC, after the PC enables the keyboard and mouse sharing mode, and the another terminal, for example, the mobile phone, creates the virtual input device, generally, the PC temporarily responds to an operation of the mouse, in other words, the user can temporarily control the PC by using the mouse. In this embodiment, after the keyboard and mouse sharing mode is enabled, after determining that a mouse shuttle condition is met, the PC may trigger the another terminal that establishes the connection to the PC and that creates the virtual input device, for example, the mobile phone, to respond to the mouse operation, that is, trigger keyboard and mouse sharing between the PC and the mobile phone.

For example, the mouse shuttle condition may be that a cursor, for example, a cursor 1, displayed on the display of the PC, slides to the projection interface displayed on the display of the PC. For example, the input device is the mouse. The user may move the mouse, so that the cursor 1 displayed on the display of the PC slides to the projection interface displayed on the display of the PC, to trigger keyboard and mouse sharing between the PC and the mobile phone. For example, the method further includes S503 and S504.

S503: The PC receives a mouse movement event, and displays, on the display of the PC based on the mouse movement event, an animation in which the cursor 1 moves.

The cursor 1 may be a first cursor in this embodiment of this application.

S504: When determining that the cursor 1 enters the projection interface, the PC sends first indication information to the mobile phone, to indicate that keyboard and mouse sharing starts.

When the user wants to perform an operation on the projection interface of the projection destination end, to implement an operation for an actual interface of the projection source end, the user may operate the input device of the projection destination end, for example, input a first operation, so that the cursor displayed on the projection destination end moves to the projection interface. In this embodiment, after the cursor displayed on the projection destination end enters the projection interface, the projection destination end and the projection source end may start keyboard and mouse sharing.

For example, the input device is the mouse, the projection destination end is the PC, and the projection source end is the mobile phone. The user may move the mouse of the PC, so that the cursor 1 moves on the display of the PC. In a process in which the cursor 1 moves on the display of the PC, the PC may determine whether the cursor 1 enters the projection interface displayed on the display of the PC. For example, as described above, the projection interface is displayed in a projection window of the PC, and the projection window may be used to monitor whether the cursor 1 enters the projection interface. For example, when the cursor 1 enters the projection interface, the projection window may detect a corresponding event, where the event indicates the cursor 1 to enter the projection window, and the PC may determine, based on the event, that the cursor 1 enters the projection interface. When it is determined that the cursor 1 enters the projection interface displayed on the display of the PC, the PC may determine that the mouse shuttle condition is met, and then may start keyboard and mouse sharing with the mobile phone. In addition, after determining that mouse shuttle starts, the PC may further send the first indication information to the mobile phone, to indicate, to the mobile phone, that keyboard and mouse sharing starts.

Figure 7A:
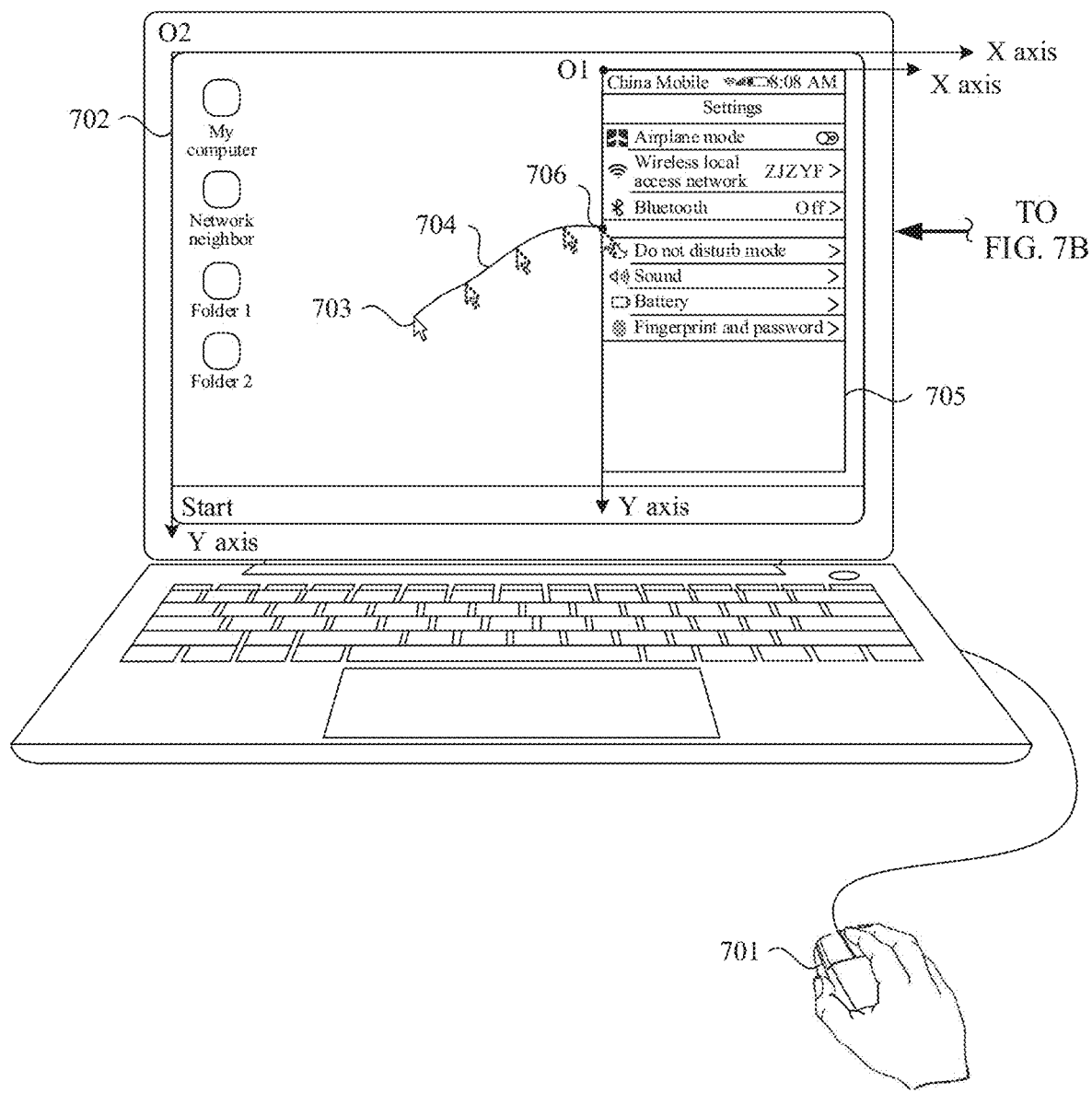
FIG. 7A and FIG. 7B are a schematic diagram of still another display interface according to an embodiment of this application.
Figure 7B:
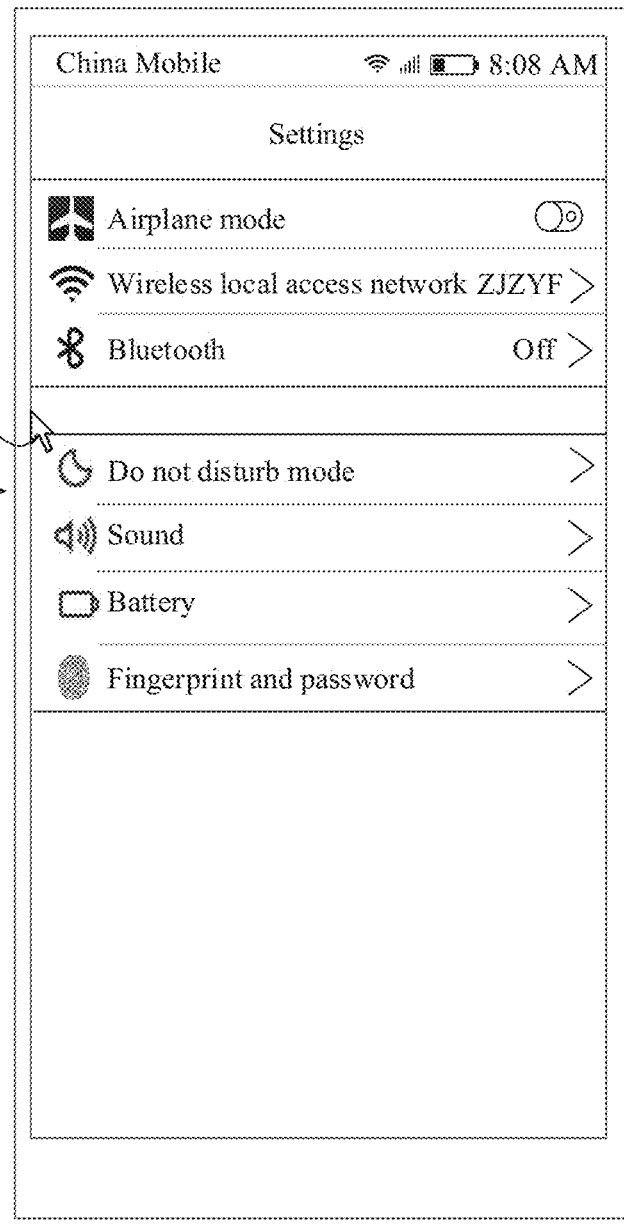

For example, with reference to FIG. 2 and FIG. 6A and FIG. 6B, in a process in which the user inputs a movement operation by using the input device of the PC, for example, the user moves the mouse, the PC may receive a corresponding input event, for example, a movement event, where the movement event may be referred to as a mouse movement event. Based on the received mouse movement event, the Windows system of the PC may draw the animation in which the cursor 1 moves and display the animation on the display of the PC. As shown in FIG. 7A and FIG. 7B, as a mouse 701 moves, the PC correspondingly displays, on a display 702 of the PC, an animation in which a cursor 703 moves. A movement track of the cursor 703 shown in FIG. 7A and FIG. 7B is shown as a track 704. In a process in which the cursor 703 moves on the display 702 of the PC, the projection service module at the application layer of the PC may determine, by using the projection window, whether the cursor 703 enters a projection interface 705. For example, when the cursor 703 enters the projection interface 705, the projection window may detect an event indicating the cursor 703 to enter the projection window. After detecting the event, the projection window may send a notification to the projection service module at the application layer of the PC, to notify the projection service module of the PC that the cursor has entered the projection interface 705. After the projection service module of the PC determines that the cursor 703 enters the projection interface, it may be determined that the mouse shuttle condition is met. Then, the PC and the mobile phone may start keyboard and mouse sharing. The projection service module of the PC may further send, to the mobile phone (for example, the projection service module in the mobile phone), indication information indicating that keyboard and mouse sharing starts. After receiving the indication information, the mobile phone may prepare for receiving an input event from the PC, for example, a mouse event. It should be noted that, in the foregoing example, an example in which communication between the PC and the mobile phone is performed by using the projection service module included in each of the PC and the mobile phone is used for description. In other words, the projection service module has a function of communicating with another terminal. In some other embodiments, the projection service module may not have the function of communicating with another terminal. In this embodiment, communication between the PC and the mobile phone may be implemented by using another module. For example, the PC and the mobile phone may further include a transmission management module, and communication between the PC and the mobile phone may be implemented by using the module. This is not specifically limited in this embodiment. For ease of description, in the following embodiment, an example in which communication between the PC and the mobile phone is implemented by using the projection service module is used for description.

In addition, when the user performs the operation on the projection interface by using the input device at the projection destination end, the projection source end can accurately positions content, for example, a control, that corresponds to an operation location of the user on the projection interface and that is at the projection source end. For this, in this embodiment, a cursor may be displayed at the projection source end, for example, the cursor is referred to as a cursor 2, and the cursor 2 may be moved with the operation of the user for the input device at the projection destination end. The cursor 2 may be a second cursor in this embodiment of this application. For example, the method further includes S505 to S508.

S505: The PC sends, to the mobile phone, an initial coordinate location of the cursor 1 obtained when the cursor 1 enters the projection interface.

The initial coordinate location is a coordinate location of an entry point relative to an origin on the projection interface (or the projection window) (where the origin may be a corner (for example, referred to as a first corner) of the projection interface, for example, an origin O1 shown in FIG. 7A and FIG. 7B) when the cursor 1 enters the projection interface.

S506: The mobile phone displays the cursor 2 on the display of the mobile phone based on the initial coordinate location.

The cursor 2 is an invisible cursor, and transparency of the cursor 2 is greater than a threshold. For example, the transparency of the cursor 2 is very high, or the cursor 2 is totally transparent.

After determining that mouse shuttle starts, the PC used as the projection destination end may obtain the coordinate location of the entry point relative to the origin on the projection interface when the cursor 1 enters the projection interface (that is, obtain the foregoing initial coordinate location), and send the initial coordinate location to the mobile phone used as the projection source end.

In an example, after the cursor 1 enters the projection interface, the PC may obtain a coordinate location of the entry point in a display coordinate system of the PC when the cursor 1 enters the projection interface, for example, referred to as a coordinate location 1. The PC may determine the initial coordinate location based on the coordinate location 1 and a coordinate location, for example, referred to as a coordinate location 2, of the upper left corner of the projection interface in the display coordinate system of the PC.

Figure 8:
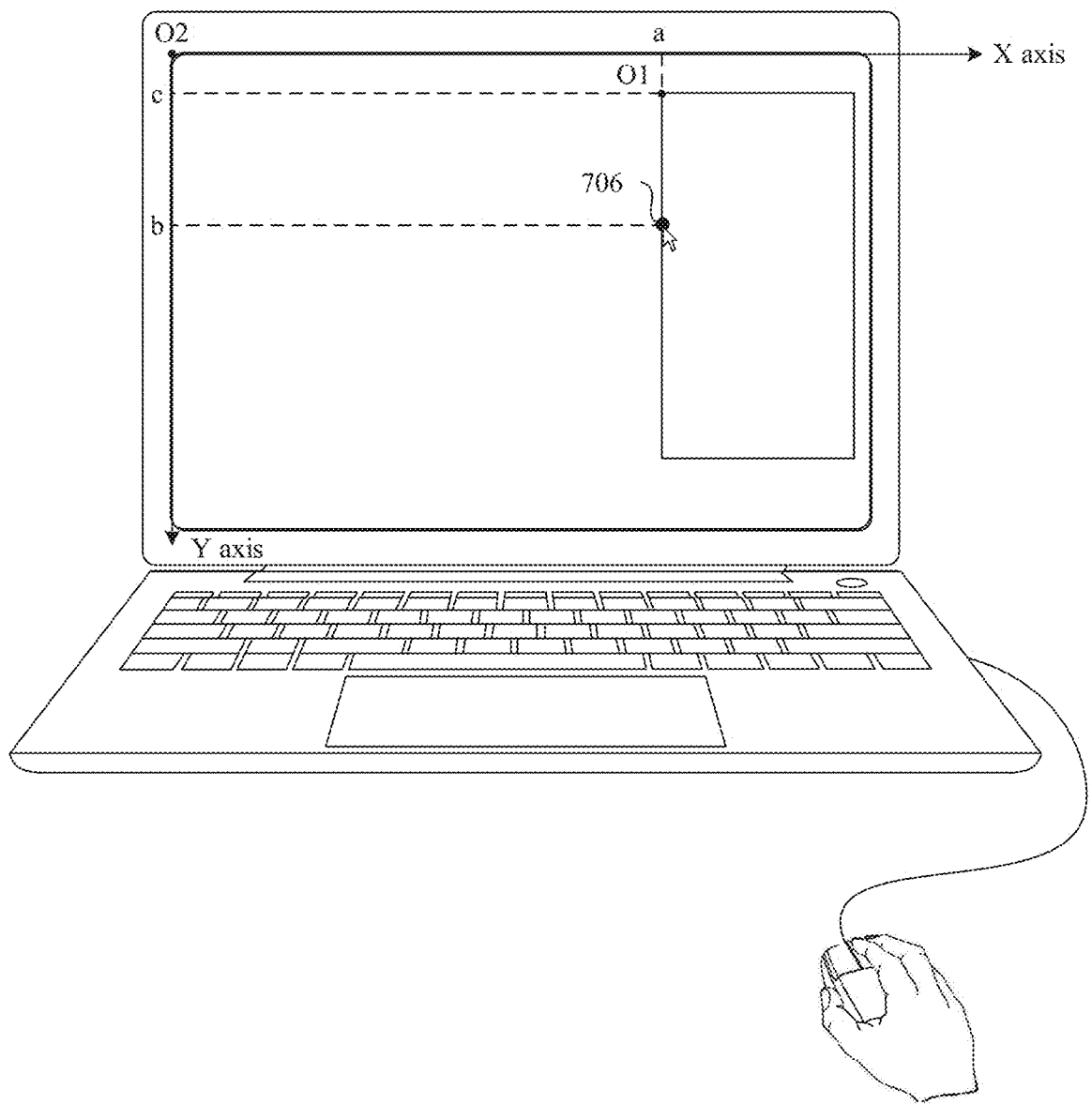
FIG. 8 is a schematic diagram of a display coordinate system according to an embodiment of this application.

For example, refer to FIG. 8. The display coordinate system of the PC may be a coordinate system in which the upper left corner of the PC is a coordinate origin (a location O2 shown in FIG. 8), and an X axis points from the coordinate origin O2 to the right edge of the display of the PC, a Y axis points from the coordinate origin O2 to the lower edge of the display of the PC. With reference to FIG. 7A and FIG. 7B, the entry point obtained when the cursor 1 enters the projection interface is shown as an entry point 706 in FIG. 7A and FIG. 7B. After determining that the cursor 1 enters the projection interface, the PC may obtain the coordinate location 1 of the entry point 706 in the display coordinate system of the PC. For example, the obtained coordinate location 1 is (a, b). When displaying the projection interface, the PC knows a location of the projection window used to display the projection interface in the display coordinate system of the PC, where a location of the projection window is a location of the projection interface. In this case, the PC knows the coordinate location of the upper left corner of the projection interface in the display coordinate system of the PC. For example, the PC knows the coordinate location 2, and the coordinate location 2 is (a, c). The PC may determine, based on the coordinate location 1 and the coordinate location 2, the coordinate location of the entry point 706 relative to the coordinate origin O1, that is, determine the initial coordinate location. For example, the initial coordinate location determined by the PC is (0, b-c).

After receiving the initial coordinate location, the mobile phone may determine, based on the initial coordinate location, a start location at which the cursor 2 appears on the mobile phone. The mobile phone may display the cursor 2 at the start location.

It may be understood that a window used to display the projection interface is the projection window, and a size of the projection interface is determined by a size of the projection window. For example, the size of the projection interface is the same as the size of the projection window. The size of the projection window may be predefined, and resolution of the projection window may be the same as or different from resolution of the mobile phone. For example, if the size of the projection window is different from the resolution of the mobile phone, content of the projection interface in the projection window is the same as content in the interface projected by the mobile phone, but the projection interface is an interface obtained after stretching and/or compression processing is performed on the interface projected by the mobile phone.

When the size of the projection window is different from the resolution of the mobile phone, to enable the start location of the cursor 2 displayed on the mobile phone to be consistent with the location at which the cursor 1 enters the projection interface, the mobile phone may obtain, through calculation based on the resolution of the mobile phone and the size of the projection interface by using the initial coordinate location as a basis, the start location of cursor 2 appeared on the mobile phone. That is, after receiving the initial coordinate location from the PC, the mobile phone may determine, based on the resolution of the mobile phone, the size of the projection interface (or the size of the projection window), and the initial coordinate location, the start location at which the cursor 2 appears on the mobile phone. The start location is a coordinate location of the cursor 2 relative to the origin of the display of the mobile phone (where the origin may be the corner (for example, referred to as the first corner) of the display of the mobile phone).

The size of the projection window may be sent by the PC to the mobile phone in the process of establishing the connection to the mobile phone by the PC, or after the connection is successfully established.

Figure 9:
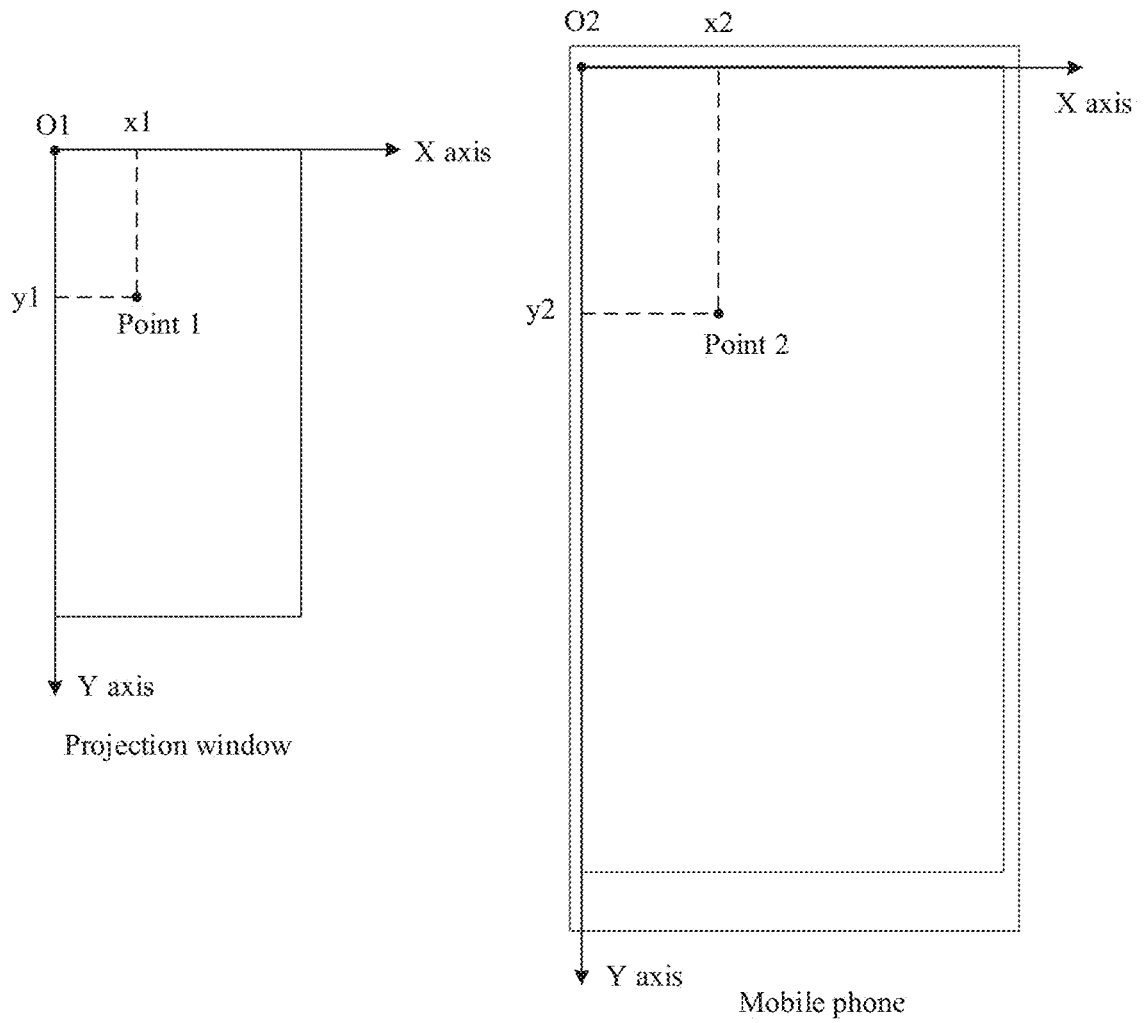
FIG. 9 is a schematic diagram of another display coordinate system according to an embodiment of this application.

For example, as shown in FIG. 9, it is assumed that when the cursor 1 is displayed at a location shown by a point 1 on the projection interface, a corresponding location at which the cursor 2 should be displayed on the display of the mobile phone is a location shown by a point 2. For example, the size of the projection window is $A1 \times B1$, the resolution of the mobile phone is $A2 \times B2$, coordinates of the point 1 in a coordinate system 1 are $(x1, y1)$, and coordinates of point 2 in a coordinate system 2 are $(x2, y2)$. The coordinate system 1 is the coordinate system in which the upper left corner of the projection window is the coordinate origin (for example, O1 in FIG. 9), the X axis points from the coordinate origin O1 to the right edge of the projection window, and the Y axis points from the coordinate origin O1 to the lower edge of the projection window. The coordinate system 2 is the coordinate system in which the upper left corner of the display of the mobile phone is the coordinate origin (for example, O2 in FIG. 9), the X axis points from the coordinate origin O2 to the right edge of the display of the mobile phone, and the Y axis points from the coordinate origin O2 to the lower edge of the display of the mobile phone. The mobile phone may determine a conversion relationship between the coordinate location of the cursor 1 in the coordinate system 1 and the coordinate location of the cursor 2 in the coordinate system 2 based on the size of the projection window and the resolution of the mobile phone. For example, the coordinate location of the cursor 1 on the X axis in the coordinate system 1 and the coordinate location of the cursor 2 on the X axis in the coordinate system 2 should meet $x1/A1=x2/A2$. Therefore, when the coordinate location of the cursor 1 on the X axis in the coordinate system 1 is known, the coordinate location of the cursor 2 on the X axis in the coordinate system 2 is $x2=(A2/A1) \times x1$, where the formula may be referred to as a conversion relationship 1, and $A2/A1$ may be referred to as a conversion ratio value 1. Similarly, the coordinate location of the cursor 1 on the Y axis in the coordinate system 1 and the coordinate location of the cursor 2 on the Y axis in the coordinate system 2 should meet $y1/B1=2/B2$. Therefore, when the coordinate location of the cursor 1 on the Y axis in the coordinate system 1 is known, the coordinate location of the cursor 2 on the Y axis in the coordinate system 2 is $y2=(B2B1) \times y1$, where the formula may be referred to as a conversion relationship 2, and $B2/B1$ may be referred to as a conversion ratio value 2. For example, if the resolution of the mobile phone is $2340 \times 1080$ and the size of the projection window is $1170 \times 540$, the conversion ratio 1 is 2, and the conversion ratio 2 is 2.

In a possible implementation, after receiving the initial coordinate location from the PC, the mobile phone may determine, based on the foregoing conversion relationship (for example, the conversion relationship 1 and/or the conversion relationship 2), the start location at which the cursor 2 appears on the mobile phone. In another possible implementation, the mobile phone may predetermine the conversion ratio value 1 and the conversion ratio value 2. After the initial coordinate location is received, the start location at which the cursor 2 appears on the mobile phone may be determined based on the predetermined conversion ratio value 1 and/or conversion ratio value 2. For example, with reference to the example shown in FIG. 8, if the initial coordinate location is $(0, b-c)$, the mobile phone determines that the start location at which the cursor 2 appears on the mobile phone is $(0, (B2B1) \times (b-c))$. The mobile phone may display the cursor 2 on the display of the mobile phone based on the determined start location. For example, with reference to FIG. 7A and FIG. 7B, the cursor 2 displayed by the mobile phone on the display of the mobile phone is shown by 707 in FIG. 7A and FIG. 7B. It can be seen that the start location of the cursor 2 displayed on the mobile phone is the same as the location of the entry point when the cursor 1 on the PC enters the projection interface.

The cursor 2 displayed by the mobile phone may be an invisible cursor whose transparency is greater than the threshold. For example, the transparency of the cursor 2 is very high, or the cursor 2 is totally transparent. In other words, the cursor 2 is invisible to the user. Alternatively, the cursor 2 may be a visible cursor, and is visible to the user. This is not limited in this embodiment. For ease of description, in the accompanying drawings of embodiments of this application, an example in which the cursor 2 is visible to the user is used.

In addition, in the foregoing embodiment, an example in which the projection destination end obtains the initial coordinate location and sends the initial coordinate location to the projection source end, and the projection source end determines, based on the initial coordinate location, the start location at which the cursor 2 appears at the projection source end is used for description. In some other embodiments, after obtaining the initial coordinate location, the projection destination end may also determine, based on the initial coordinate location, the start location at which cursor 2 appears at the projection source end, and then send the start location to the projection source end, so that the projection source end displays the cursor 2. A specific determining process is the same as a determining process in which the projection source end determines the start location at which the cursor 2 appears. Details are not described herein again. The resolution of the device at the projection source end may be sent to the projection destination end in a process of establishing the connection to the projection destination end, or after the connection is successfully established. When the size of the projection window is the same as the resolution of the mobile phone, without conversion processing, the mobile phone may directly display the cursor 2 on the mobile phone based on the initial coordinate location.

S507: The PC sends a mouse operation parameter 1 included in the mouse movement event to the mobile phone.

S508: The mobile phone receives the mouse operation parameter 1, and simulates the mouse movement event based on the mouse operation parameter 1. The mobile phone displays, on the display of the mobile phone based on the mouse movement event, the animation in which the cursor 2 moves.

The mouse movement event may be a first input event in embodiments of this application. The mouse operation parameter 1 may be a first operation parameter in embodiments of this application.

After the cursor 1 enters the projection interface, the user may continue to operate the input device at the projection destination end, so that the cursor 1 moves to a desired location on the projection interface. After the cursor 1 enters the projection interface, keyboard and mouse sharing has started. After keyboard and mouse sharing starts, the projection destination end may not respond to the input event received after the user operates the input device, but send the operation parameter in the input event to the projection source end shared by the keyboard and mouse, so that the projection source end responds to the input event.

When the input device is the mouse, the input event may include a mouse movement event, a mouse press event, a mouse uplift event, and the like. It should be specially noted that, when the cursor 2 displayed on the mobile phone is the invisible cursor, the projection interface projected by the mobile phone to the PC does not include a cursor, and the cursor 1 is displayed on the PC. Therefore, to enable the cursor, for example, the cursor 1, to move, when the user moves the mouse, as the mouse moves, after keyboard and mouse sharing starts, that the projection destination end does not respond to the input event received after the user operates the input device may be specifically as follows: The projection target end does not respond to another mouse event other than the mouse movement event, for example, a mouse press event and a mouse lift event, but responds to the mouse movement event, so that the cursor 1 may move on the display of the PC accordingly after the user moves the mouse.

In an example implementation, the projection destination end, for example, the PC, may mount a hook (HOOK) after a keyboard and mouse sharing mode is enabled. The mounted hook may be used to intercept (or shield) the another input event other than the mouse movement event after keyboard and mouse sharing starts. After keyboard and mouse sharing starts, the mounted hook may be used to obtain (or capture) operation parameters included in a corresponding input event (which include the mouse movement event and the another input event). For example, if the input device is the mouse, the input event may be the mouse event. That is, after the cursor enters the projection interface, keyboard and mouse sharing starts, and then the PC may intercept the another input event other than the mouse movement event by using the mounted hook. The PC may further capture, by using the mounted hook, the operation parameter in the received mouse event, for example, referred to as the mouse operation parameter, and send the captured operation parameter to the projection source end that creates the virtual input device, so that the projection source end may simulate the corresponding input event, for example, the mouse event, by using the created virtual input device, to respond to the input event. In this way, for the mouse movement event, not only the projection destination end may respond to the operation input by the input device, but also the projection source end may respond to the operation input by the input device. For the another input event other than the mouse movement event, because the mounted hook intercepts the input event, the projection target end does not respond to the input event. Instead, the projection source end responds to, based on an operation parameter sent by the projection destination end, an operation input by the input device.

The mouse operation parameter may include a mouse button flag bit (used to indicate which operation of press, uplift, movement, or scrolling wheel scrolling is performed by the user), coordinate information (used to indicate an X coordinate and a Y coordinate of a cursor moved when the user moves the mouse), scroll wheel information (used to indicate an X-axis distance and a Y-axis distance of scrolling of the scroll wheel when the user operates the scroll wheel of the mouse), and button location information (used to indicate which button of a left button, a middle button, or a right button of the mouse is operated by the user). In an example, after keyboard and mouse sharing starts, the mounted hook may determine, based on the mouse button flag bit in the mouse operation parameter, whether the input event is the mouse movement event. If the input event is the mouse movement event, interception is not performed. If the input event is not the mouse movement event, interception is performed.

Certainly, another manner (for example, registering RAWINPUT in the PC) may also be used to intercept the input event and capture the operation parameter in the input event. Alternatively, different manners may also be separately used to intercept the input event and capture the operation parameter in the input event. For example, the input device is the mouse. After enabling the keyboard and mouse sharing mode, the PC may mount the hook and register RAWINPUT. After keyboard and mouse sharing starts, the mounted hook may be used to intercept the another mouse event other than the mouse movement event, and registered RAWINPUT may be used to capture the parameter in the mouse event. A specific implementation of intercepting the mouse event and capturing the parameter in the mouse event is not limited herein in this embodiment. For ease of description, the following embodiments are described by using an example the hook is mounted to intercept the input event and capture the operation parameter in the input event.

Figure 10A:
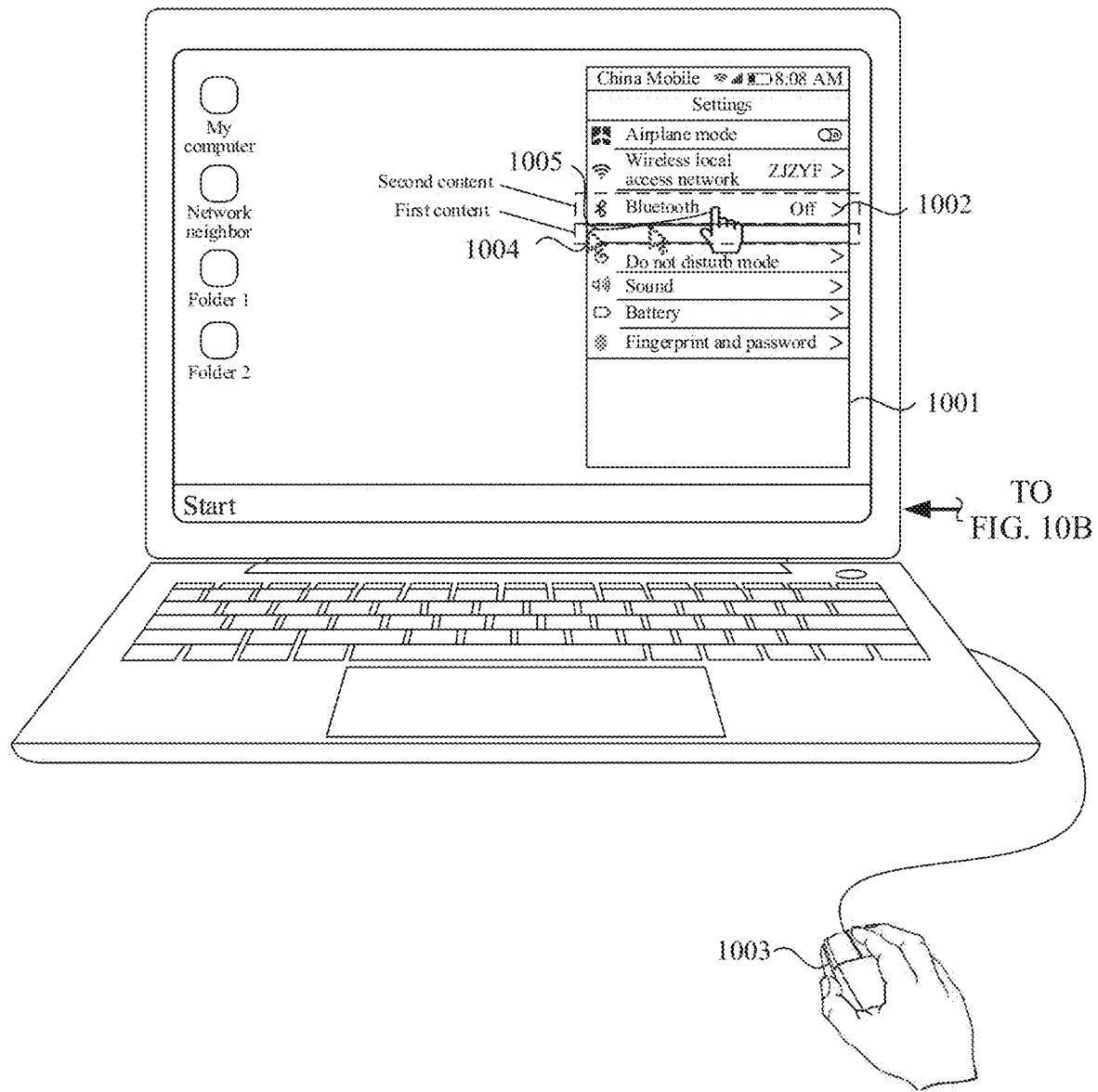
FIG. 10A and FIG. 10B are a schematic diagram of yet another display interface according to an embodiment of this application.
Figure 10B:
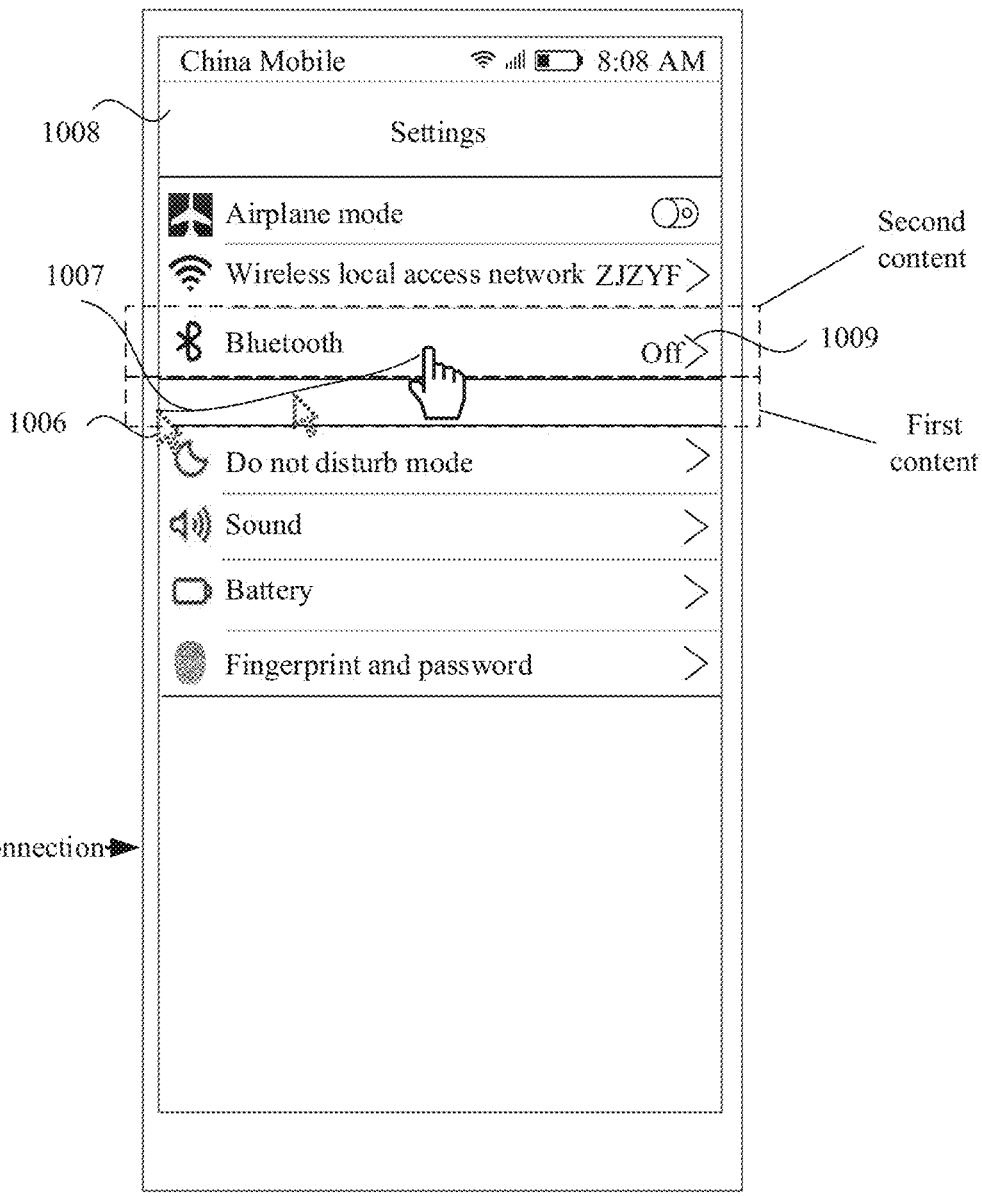

For example, with reference to FIG. 2 and FIG. 7A and FIG. 7B, the input device is the mouse. For example, the user wants to open a Bluetooth setting interface of the mobile phone. As shown in FIG. 10A and FIG. 10B, after the user moves the mouse of the PC to enable the cursor 1 to enter a projection interface 1001, the user continues to move the mouse, so that the cursor 1 moves to a location of a Bluetooth option 1002 on the projection interface 1001. After the cursor 1 enters the projection interface 1001, keyboard and mouse sharing has started. After keyboard and mouse sharing starts, the mounted hook may intercept the another mouse event other than the mouse movement event. Therefore, after the user continues to move the mouse, the PC may receive a corresponding input event, for example, a mouse movement event, and the mounted hook does not intercept the mouse movement event. The event is transmitted to the Windows system of the PC. Based on the received mouse movement event, the windows system of the PC may continue to draw an animation in which the cursor 1 moves and display the animation on the display of the PC. As shown in FIG. 10A and FIG. 10B, as a mouse 1003 moves, the PC correspondingly displays, on the display of the PC, an animation in which a cursor 1004 moves. As shown in FIG. 10A and FIG. 10B, a movement track of the cursor 1004 is shown as a track 1005. It may be seen that, the cursor 1004 moves to a location of the Bluetooth option 1002 on the projection interface 1001. After the cursor 1004 enters the projection interface and moves before the Bluetooth option 1002, it may be considered that the cursor 1004 is displayed on an element of the projection interface. The element may be first content in this embodiment. It may be seen that, on the first content, a cursor style of the cursor 1004 is a style 1 (the style 1 may be a first style in this embodiment), that is, a normal selection style.

In addition, after keyboard and mouse sharing starts, the mounted hook may capture the operation parameter in the input event. Therefore, in a process in which the user continues to move the mouse, the PC, for example, the projection service module at the application layer of the PC may capture, by using the mounted hook, the operation parameter in the received mouse movement event, for example, referred to as the mouse operation parameter 1, and send the mouse operation parameter 1 to the mobile phone at the projection source end. In an example, the mouse operation parameter 1 may be a mouse button flag bit used to indicate that the user moves the mouse, coordinate information used to indicate an X coordinate and a Y coordinate of the moved cursor (for example, the cursor 1), scroll wheel information (where a value is empty), and button location information (where a value is empty). The coordinate information indicates relative displacement of the cursor 1 relative to the location of the cursor 1 when the cursor 1 enters the projection interface in the mouse movement process.

After receiving the mouse operation parameter 1, the mobile phone may simulate, based on the mouse operation parameter 1, the corresponding input event by using the created virtual input device, for example, the mouse movement event, so that the cursor 2 on the mobile phone may also move to the location of the Bluetooth option on the actual interface displayed by the mobile phone.

As described in S506, the size of the projection window may be different from the resolution of the mobile phone. Therefore, after the user moves the mouse of the PC, to enable the cursor 2 to move to the location of the Bluetooth option on the actual interface, the mobile phone may obtain, through calculation based on the resolution of the mobile phone and the size of the projection interface by using the coordinate information in the mouse operation parameter 1 as a basis, relative displacement of the cursor 2 on the mobile phone relative to the start location.

For example, similar to the descriptions in FIG. 9, the size of the projection window is A1×B1, and the resolution of the mobile phone is A2×B2. For example, after the user continues to move the mouse, the relative displacement of the cursor 1 in the coordinate system 1 relative to the entry point is (X3, Y3), and the relative displacement of the cursor 2 relative to the start location in the coordinate system 2 is (X4, Y4). The mobile phone may determine, based on the size of the projection window and the resolution of the mobile phone, a conversion relationship between the relative displacement of the cursor 1 in the coordinate system 1 relative to the entry point and the relative displacement of the cursor 2 in the coordinate system 2 relative to the start location after the mouse moves. For example, the relative displacement of the cursor 1 on the X axis in the coordinate system 1 and the relative displacement of the cursor 2 on the X axis in the coordinate system 2 should meet X3/A1=X4/A2. Therefore, when the relative displacement of the cursor 1 on the X axis in the coordinate system 1 is known, the relative displacement of the cursor 2 on the X axis in the coordinate system 2 is X4=(A2/A1)×X3, where the formula may be referred to as a conversion relationship 3, and A2/A1 may be referred to as a conversion ratio value 1. Similarly, the relative location of the cursor 1 on the Y axis in the coordinate system 1 and the relative displacement of the cursor 2 on the Y axis in the coordinate system 2 should meet Y3/B1=Y4/B2. Therefore, when the relative displacement of the cursor 1 on the Y axis in the coordinate system 1 is known, the relative displacement of the cursor 2 on the Y axis in the coordinate system 2 is Y4=(B2/B1)×Y3, where the formula may be referred to as a conversion relationship 4, and B2/B1 may be referred to as a conversion ratio value 2. For example, if the resolution of the mobile phone is 2340×1080 and the size of the projection window is 1170×540, the conversion ratio 1 is 2, and the conversion ratio 2 is 2. That is, the movement distances of cursor 1 on the X axis and Y axis in the projection window are calculated as twice the original values on the mobile phone. The relative displacement (X3, Y3) of the cursor 1 in the coordinate system 1 relative to the entry point may be determined based on the coordinate information in the mouse operation parameter 1.

In a possible implementation, after receiving the mouse operation parameter 1 from the PC, the mobile phone (for example, the projection service module at the application layer of the mobile phone) may determine, based on the coordinate information in the mouse operation parameter 1 and the foregoing conversion relationship (for example, the conversion relationship 3 and/or the conversion relationship 4), the relative displacement of the cursor 2 on the mobile phone relative to the start location. Alternatively, the mobile phone may predetermine the conversion ratio value 1 and the conversion ratio value 2. After receiving the mouse operation parameter 1 from the PC, the mobile phone may determine, based on the predetermined conversion ratio value 1 and/or conversion ratio value 2 and the coordinate information in the mouse operation parameter 1, the relative displacement of the cursor 2 on the mobile phone relative to the start location. Based on the determined relative displacement and other parameters (for example, the mouse button flag bit, the scroll wheel information, and the button location information) in the mouse operation parameter 1, the mobile phone (for example, the framework layer of the mobile phone) may simulate the corresponding input event, for example, the mouse movement event, by using the created virtual input device. Based on the mouse movement event, the framework layer of the mobile phone may draw the animation in which the cursor 2 moves and display the animation on the display of the mobile phone. Still refer to FIG. 10A and FIG. 10B. As the mouse 1003 moves, the mobile phone may correspondingly display, on the display of the mobile phone, an animation in which a cursor 1006 moves. As shown in FIG. 10A and FIG. 10B, a movement track of the cursor 1006 is shown as a track 1007. It may be seen that, because the coordinate information indicates coordinates obtained conversion, the cursor 1006 moves to the location of a Bluetooth option 1009 on an actual interface 1008. In this way, the user operates the mouse of the PC to move the cursor 1 on the display of the PC to the desired location on the projection interface, and move the cursor 2 on the display of the mobile phone to the corresponding location.

It may be understood that, as described in S506, when the cursor 2 displayed by the mobile phone is an invisible cursor, when the user moves the mouse of the PC to move the cursors on both the mobile phone and the PC, the animation in which the cursor 2 moves on the mobile phone may be invisible to the user. FIG. 10A and FIG. 10B show only the animation in which the cursor 2 moves for ease of understanding.

In addition, it should be noted that, because the operating systems of the PC and the mobile phone are different, button values in mouse operation parameters in mouse events corresponding to the PC and the mobile phone are different. Therefore, after receiving the mouse operation parameter 1, the mobile phone may convert, based on a preset mapping relationship, a button bit code of the received mouse operation parameter 1 into a button bit code that can be identified by the mobile phone. Then, the mobile phone may simulate, by using the created virtual input device based on the mouse operation parameter 1 obtained after the button bit code is converted, the input event that can be identified by the mobile phone, for example, the mouse movement event, to correspondingly respond.

S509: When the cursor 2 moves to a control on the current display interface of the mobile phone, the mobile phone changes the cursor 2 from the style 1 to a style 2.

S510: The mobile phone sends a cursor type in the style 2 to the PC.

S511: The PC displays the cursor 1 on the display of the PC based on the cursor type, and updates the projection interface.

Generally, for content, for example, the control, on the display interface, to enable the user to visually know whether the user may perform a next operation, when the user operates the input device, for example, the mouse, to move the cursor to the control, the control and/or cursor may provide corresponding visual feedback if the next operation can be performed on the control. In this embodiment, when the cursor 1 moves to a location of the control on the projection interface, if the control corresponding to a control on the mobile phone is the control on which the next operation can be performed, the control and/or the cursor 1 on the projection interface may provide corresponding visual feedback. For example, the control presents the highlighted background. For another example, the style of the cursor 1 changes.

As described in S507 and S508, when the user operates the mouse of the PC to move the cursor 1 to the control on the projection interface, the cursor 2 on the display of the mobile phone also moves to a location of the corresponding control on the display interface of the mobile phone. For the mobile phone, when the cursor 2 moves to the location of the control on the display interface, if the next operation can be performed on the control, a cursor style of the cursor 2 changes. For example, the cursor style of the cursor 2 changes from the style 1 to the style 2. For example, if the cursor 2 moves from one piece of content (for example, the content may be the first content in this embodiment) in the interface to another piece of content (for example, the content may be second content in this embodiment) in the interface, the cursor style of the cursor 2 is changed from the style 1 (the style 1 may be the first style in this embodiment) to the style 2 (the style 2 may be a second style in this embodiment).

It may be understood that the cursor has a plurality of cursor styles, and different cursor styles have different cursor types. FIG. 11 is a schematic diagram of a cursor style and a cursor type corresponding to the cursor style according to this embodiment. The cursor styles may include a normal selection style, a link selection style, a text selection style, a movement style, a vertical adjustment style, and the like. The corresponding cursor types include normal selection, link selection, text selection, movement, and vertical adjustment. When the cursor is located on different controls, cursor styles of the cursor may be different or the same. A specific correspondence between a control and a cursor style may be predefined by a third-party application developer or a device manufacturer and stored in the mobile phone, provided that the cursor style changes when the cursor moves to the control. When the cursor 2 moves to the location of the control on the display interface, if the next operation can be performed on the control, the mobile phone may change the cursor style of the cursor 2 based on the pre-stored correspondence. For example, still with reference to the example shown in FIG. 10A and FIG. 10B, the cursor 2, namely, the cursor 1000, moves to the location of the Bluetooth option 1009 on the actual interface 1008, that is, the cursor 1006 moves from a location of the first content displayed on the actual interface 1008 to the second content, namely, the location of the Bluetooth option 1009. The first content is an element that is displayed on the interface and that cannot be operated. For example, it is predefined that the cursor style is the normal selection style when the cursor 2 is at the location that cannot be operated on the mobile phone, and it is predefined that the cursor style is the link selection style when the cursor 2 is on the Bluetooth option 1009. When the cursor 2 moves from the location of the first content to the location of the Bluetooth option 1009 on the actual interface 1008, the cursor style of the cursor 2 changes from the normal selection style to the link selection style.

After the cursor style of the cursor 2 on the mobile phone is changed, the mobile phone may send a cursor type corresponding to the changed cursor style to the PC. For example, after the mobile phone displays the cursor 2, a cursor style monitor may be registered at the framework layer of the mobile phone. In this way, after the cursor style of the cursor 2 changes, the cursor style monitor may monitor an event indicating that the cursor style changes. The framework layer of the mobile phone may obtain the cursor type corresponding to the changed cursor style, for example, the style 2, and send the cursor type to the PC by using the projection service module at the application layer of the mobile phone.

After receiving the cursor type corresponding to the style 2, the projection service module of the PC, for example, at the application layer of the PC, may display the cursor 1 on the display of the PC based on the cursor type. For example, still with reference to the example shown in FIG. 10A and FIG. 10B, the cursor 1, namely, the cursor 1004, changes from the normal selection style at the first content of the projection interface to the link selection style. This presents the user with a visual effect that the cursor style changes when the cursor 1 moves to the location of the control on the projection interface.

In addition, when the cursor 2 moves to the location of the corresponding content of the display interface of the mobile phone, the content may provide corresponding visual feedback. For example, a display manner of the first content may be changed from a first manner to a second manner, and a display manner of the second content may be changed from a third manner to a fourth manner. Display manners of different content before the change may be the same or may be different. The display manners of different content after the change may be the same or different. For example, the content is the control, the first manner is the same as the third manner, and the highlighted background is not presented. The second manner is the same as the fourth manner, and the highlighted background is presented. In this way, when the cursor 2 moves to the location of the corresponding control on the display interface of the mobile phone, the control changes from the style of not presenting the highlighted background to the style of presenting the highlighted background. It may be understood that, during multi-screen collaboration, the mobile phone projects, in real time, the interface displayed on the display of the mobile phone to the display of the PC. Therefore, after the control presents the highlighted background, the change is also projected to the display of the PC. This presents an effect of visual feedback from the control to the user when the cursor 1 moves to the location of the control on the projection interface.

Figure 12A:
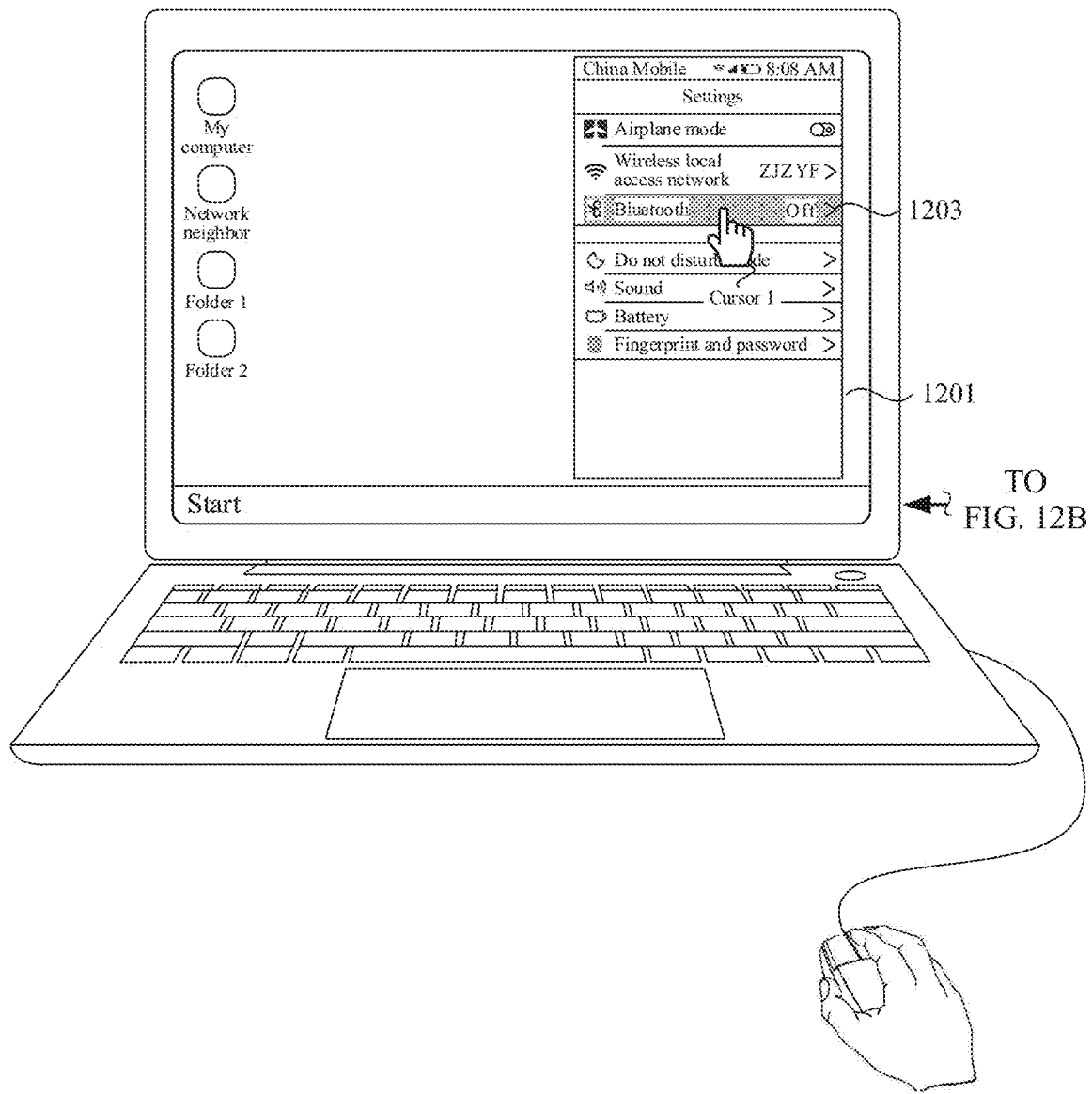
FIG. 12A and FIG. 12B are a schematic diagram of still yet another display interface according to an embodiment of this application.
Figure 12B:
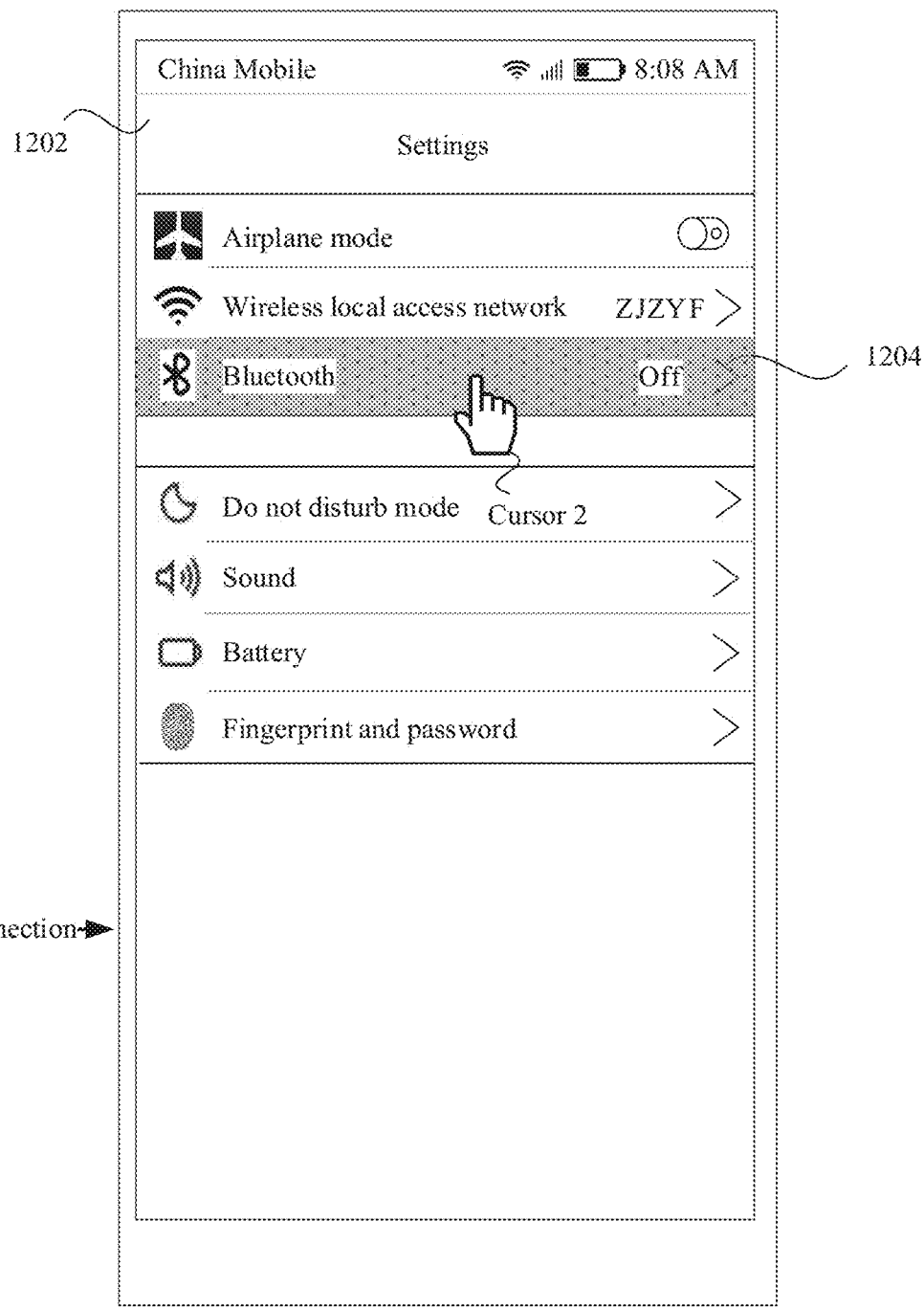

For example, with reference to FIG. 10A and FIG. 10B, both a Bluetooth option and the cursor 2 provide visual feedback when the cursor 2 moves to a location of the Bluetooth option on the display interface of the mobile phone. As shown in FIG. 12A and FIG. 12B, when the user moves the mouse of the PC to move the cursor 1 to a location of a Bluetooth option 1203 on a projection interface 1201, the Bluetooth option 1203 on the projection interface of the PC presents the highlighted background, and the cursor 1 changes from the normal selection style to the link selection style. In addition, the cursor 2 on the mobile phone also moves to a location of a Bluetooth option 1204 on an actual interface 1202, the Bluetooth option 1204 on the actual interface 1202 of the mobile phone presents a highlighted background, and the cursor 2 changes from the normal selection style to the link selection style. It should be noted that the cursor 2 may be invisible to the user.

Then, with reference to FIG. 12A and FIG. 12B, if the user wants to set Bluetooth of the mobile phone, the user may input a press operation (the press operation may be a second operation in embodiments of this application, and the second operation may alternatively be another operation) by using the input device of the PC, for example, the mouse of the PC. For example, the user may press a left button of the mouse. The PC may receive a corresponding input event, for example, a mouse press event. The mouse press event is received after keyboard and mouse sharing is enabled. Therefore, the mounted hook intercepts the mouse press event, so that the Windows system of the PC does not respond to the event. In addition, the PC (for example, the projection service module at the application layer of the PC) may obtain an operation parameter in the mouse press event, for example, referred to as a mouse operation parameter 2 (for example, capture the mouse operation parameter 2 by using the mounted hook), and send the mouse operation parameter 2 to the mobile phone. The mouse press event may be a second input event in embodiments of this application, and the mouse operation parameter 2 may be a second operation parameter in embodiments of this application. The mouse operation parameter 2 may include a mouse button flag bit indicating that the user presses the mouse, coordinate information (where a value is empty), scroll wheel information (where a value is empty), and button location information indicating that the user performs the operation on a left button of the mouse. It should be noted that, only when the value of the coordinate information in the mouse operation parameter is not empty, the mobile phone needs to perform conversion processing (for example, the specific description of the corresponding content in S508) on the coordinate information before simulating the corresponding input event. If the value of the coordinate information in the mouse operation parameter is empty, conversion processing does not need to be performed, and the corresponding input event may be obtained through simulation based on the received mouse operation parameter.

Figure 13A:
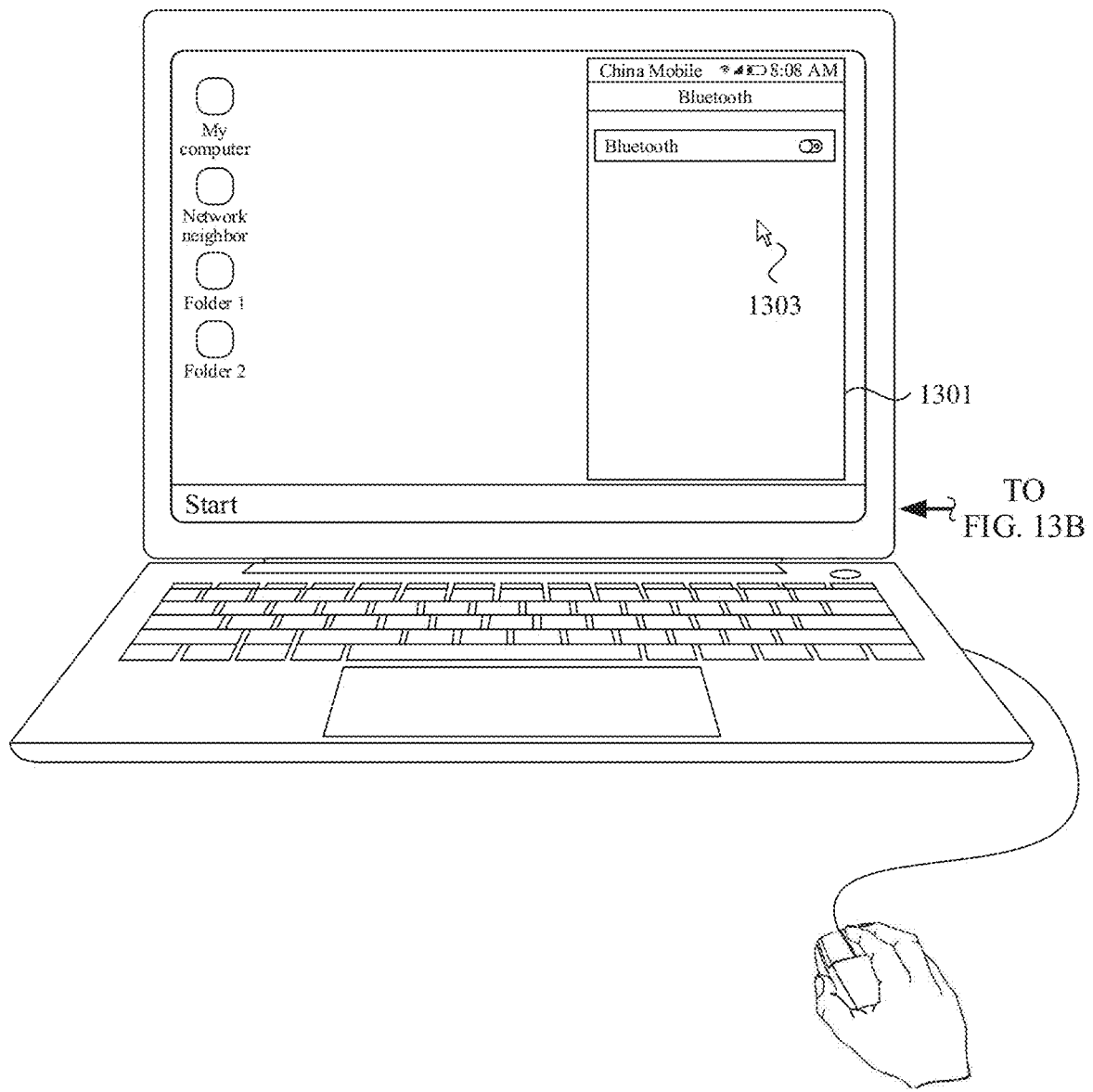
FIG. 13A and FIG. 13B are a schematic diagram of a further display interface according to an embodiment of this application.
Figure 13B:
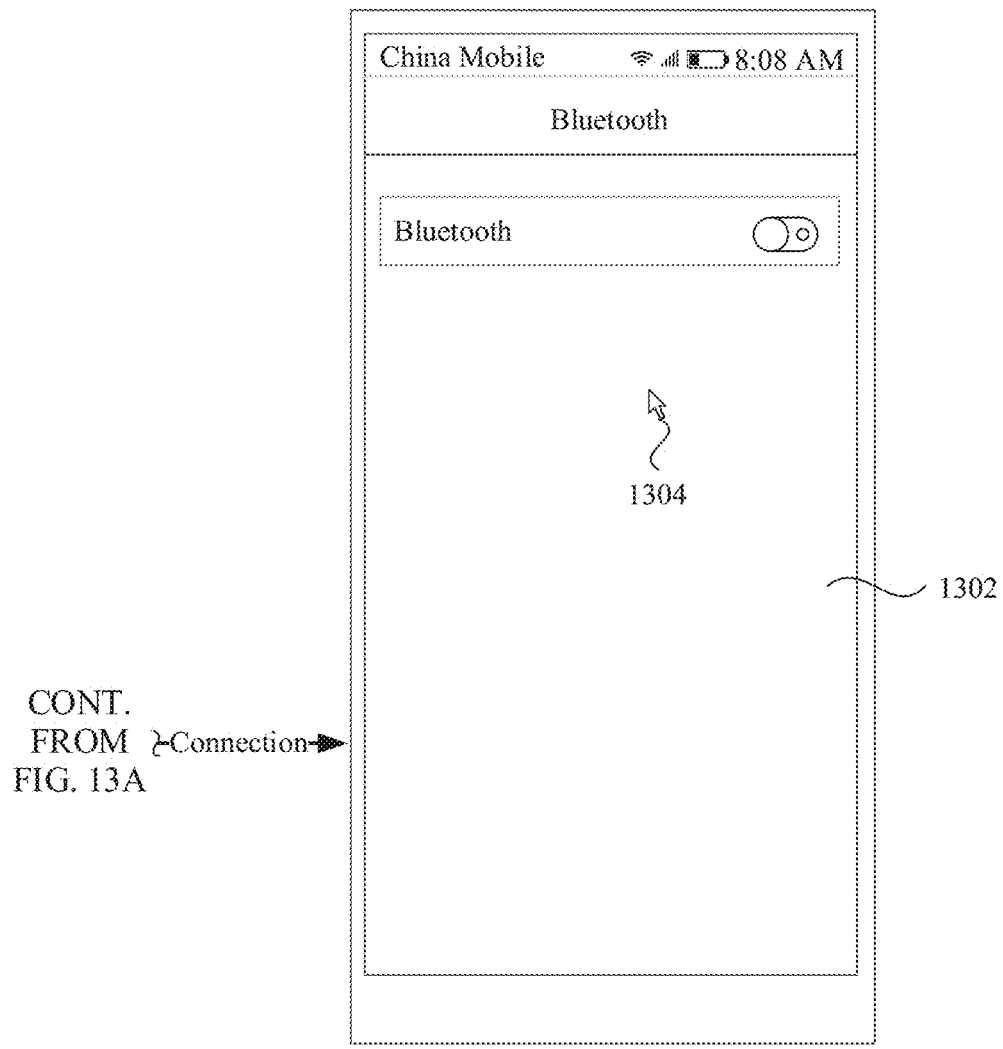

After the mobile phone (for example, the projection service module at the application layer of the mobile phone) receives the mouse operation parameter 2, the framework layer of the mobile phone may convert, based on a preset mapping relationship, a button bit code of the received mouse operation parameter 2 into a button bit code that can be identified by the mobile phone, and simulate, by using the created virtual input device based on the mouse operation parameter 2 after the button bit code is converted, the input event that may be identified by the mobile phone, for example, the mouse press event. The mobile phone may correspondingly respond based on the mouse press event, for example, display a second interface. As shown in FIG. 13A and FIG. 13B, the mobile phone displays a Bluetooth setting interface 1302. The mobile phone projects the Bluetooth setting interface 1302 displayed on the display of the mobile phone to the display of the PC, and the PC displays a projection interface 1301. In addition, it may be understood that, after the display interface of the mobile phone changes, the control at the location of the cursor 2 also changes. The mobile phone may monitor the style of the cursor 2 in real time by using the cursor style monitor. If it is determined that the style of the cursor 2 changes, the mobile phone sends the cursor type corresponding to the changed cursor style to the PC, so that the PC may change the cursor style of cursor 1. For example, with reference to FIG. 13A and FIG. 13B, after the mobile phone displays the Bluetooth setting interface 1302, if there is no control at a location of a cursor 1304, the cursor 1304 changes from the link selection style to the normal selection style. The mobile phone may send a cursor type corresponding to the normal selection style to the PC, so that the PC displays a cursor 1303 in the normal selection style in the projection window.

After the operation of the user for the projection interface is completed, the user may operate the input device of the PC, for example, move the mouse of the PC, to move the cursor 1 out of the projection interface. Similarly, the projection window used to display the projection interface may be used to monitor whether the cursor 1 moves out of the projection interface. For example, when the cursor 1 moves out of the projection interface, the projection window may detect a corresponding event, where the event is used to indicate that the cursor 1 moves out of the projection window, and the PC may determine, based on the event, that the cursor 1 moves out of the projection interface. After the cursor 1 moves out of the projection interface, the PC may determine that keyboard and mouse sharing between the PC and the mobile phone stops. The PC may send second indication information to the mobile phone, so as to indicate, to the mobile phone, that keyboard and mouse sharing stops. The PC may also uninstall the hook (or close the hook), that is, cancel interception of an input event, for example, a mouse event, and capture of an operation parameter in the input event. Then, if the user performs an operation on the input device of the PC, the PC does not intercept a received input event, but sends the received input event to the Windows system of the PC, so that the Windows system of the PC responds to the input event, that is, the user may control the PC by using the mouse of the PC. In addition, it may be understood that, when the user moves the mouse of the PC, so that the cursor 1 moves out of the projection interface, the invisible cursor 2 on the mobile phone also moves to an edge of the display of the mobile phone. In this embodiment, after receiving the second indication information, the mobile phone may resume display of the cursor 2, that is, set the cursor 2 to be visible. This can ensure that the cursor can be normally displayed on the display of the mobile phone after the mobile phone is directly connected to the mouse. The foregoing uses an example in which the PC determines whether to stop keyboard and mouse sharing. In some other embodiments, the mobile phone may also determine whether to stop keyboard and mouse sharing for description. As described in the foregoing embodiment, after the user moves the mouse of the PC, not only the cursor 1 on the display of the PC may move accordingly, but also the cursor 2 on the display of the mobile phone may move accordingly. Therefore, in a movement process of the cursor 2, the mobile phone may monitor whether the cursor 2 moves out of the edge of the display of the mobile phone. After determining that the cursor 2 moves out of the edge of the display of the mobile phone, the mobile phone may determine that keyboard and mouse sharing between the mobile phone and the PC stops. The mobile phone may send the second indication information to the PC, so as to indicate, to the PC, that keyboard and mouse sharing stops. After receiving the second indication information, the PC may uninstall the hook. The mobile phone may also resume display of the cursor 2 after determining that the cursor 2 moves out of the edge of the display of the mobile phone.

It should be noted that, in the foregoing embodiment, an example in which, when the cursor 1 enters the projection interface (for example, when the cursor 1 is at the entry point), the cursor style of the cursor 2 displayed at the start location on the mobile phone does not change, that is, the cursor style is still the normal selection style, is used for description. In some other embodiments, if the style of the corresponding cursor 2 on the mobile phone changes when the cursor 1 enters the projection interface, for example, changes from the normal selection style to the link selection style, the mobile phone may send the changed cursor type to the PC, so that the PC changes the cursor style of cursor 1 at the entry point accordingly.

In the foregoing embodiment, an example in which, after keyboard and mouse sharing starts, the mobile phone displays the invisible cursor 2, and the style of the cursor 2 changes, the changed cursor type is sent to the PC, so that the PC changes the style of the cursor 1 correspondingly, to provide visual feedback of the cursor on the projection interface of the PC is used for description. In some other embodiments, after keyboard and mouse sharing starts, the PC may hide the cursor, for example, the cursor 1, on the display of the PC, and the mobile phone displays the visible cursor 2. In this way, when the cursor 2 on the mobile phone moves to the control on which the next operation may be performed, the style of the cursor 2 may change accordingly, and/or the control may provide visual feedback. Because the interface on the mobile phone is projected to the display of the PC in real time for display, when the style of the cursor 2 changes and/or the control provides visual feedback, corresponding content projected to the projection interface of the display of the PC also changes accordingly. This can also provide a corresponding visual feedback effect for the user by using the control and/or the cursor on the projection interface. A specific implementation is similar to that in the descriptions in the foregoing embodiment. The difference lies in that, after the cursor 1 slides to the projection window, the cursor 1 on the PC is hidden, and the visible cursor 2 is displayed on the mobile phone; and the mounted hook intercepts all input events after keyboard and mouse sharing starts. Other descriptions are the same as the descriptions in the foregoing embodiment. Details are not described herein again.

In addition, in the foregoing embodiment, an example in which the input device is the mouse is used for description. In this embodiment, the input device may also be a touchpad. When the input device is the touchpad, the user may input a press operation by using a button (a left button or a right button) of the touchpad, and input a movement operation by sliding a forger on the touchpad. A specific implementation of inputting an operation by the user by using the touchpad to implement the method in this embodiment is similar to a specific implementation of inputting an operation by using the mouse to implement the method in this embodiment. Details are not described herein again.

According to the technical solution provided in this embodiment, when the user operates the input device, for example, the mouse or the touchpad, at the projection destination end to move the cursor to the control on the projection interface, the control and/or the cursor on the projection interface provide/provides corresponding visual feedback. For example, the control on the projection interface presents the highlighted background, and the cursor style changes accordingly. In this way, the user may visually determine whether the next operation may be performed on the control that corresponds to the control on the projection interface and that is displayed at the projection source end, thereby improving use experience.

Figure 14:
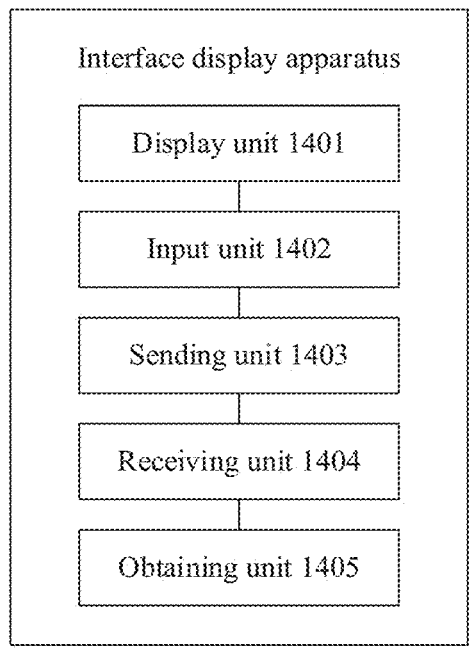
FIG. 14 is a schematic diagram of a composition of an interface display apparatus according to an embodiment of this application.

FIG. 14 is a schematic diagram of a composition of an interface display apparatus according to an embodiment of this application. As shown in FIG. 14, the apparatus may be applied to a first terminal (for example, the foregoing PC), the first terminal is connected to a second terminal, and the apparatus may include a display unit 1401 and an input unit 1402.

The display unit 1401 is configured to display a projection interface on a display of the first terminal, where content of the projection interface is a mirror of content of a first interface displayed on a display of the second terminal.

The input unit 1402 is configured to receive a first operation input by a user by using an input device of the first terminal, where the first operation is used to move a first cursor on the display of the first terminal.

When the first cursor moves to first content of the projection interface, a cursor style of the first cursor is a first style, and/or a display manner of the first content is changed from a first manner to a second manner; and when the first cursor moves to second content of the projection interface, the cursor style of the first cursor is a second style, and/or a display manner of the second content is changed from a third manner to a fourth manner.

Further, the projection interface is displayed in a part of the display of the first terminal.

The display unit 1401 is further configured to display, on the display of the first terminal in response to the first operation, an animation in which the first cursor moves.

The apparatus may further include a sending unit 1403, configured to: in a process in which the first cursor moves on the display of the first terminal, when it is determined that the first cursor enters the projection interface, send an initial coordinate location at which the first cursor enters the projection interface to the second terminal, and send data of the first operation to the second terminal.

The initial coordinate location is a coordinate location of the first cursor relative to a first corner of the projection interface when the first cursor enters the projection interface, and is used by the second terminal to display a second cursor on the display of the second terminal. The data of the first operation is used to move the second cursor on the display of the second terminal, so that when the first cursor moves to the first content, the second cursor moves to content that is of the first interface and that corresponds to the first content, and when the second cursor moves to the content corresponding to the first content, a cursor style of the second cursor is the first style, and so that when the first cursor moves to the second content, the second cursor moves to content that is of the first interface and that corresponds to the second content, and when the second cursor moves to the content corresponding to the second content, the cursor style of the second cursor is the second style.

The apparatus may further include a receiving unit 1404.

The receiving unit 1404 is configured to receive a cursor type of the first style from the second terminal when the first cursor moves to the first content of the projection interface.

The display unit 1401 is further configured to display the first cursor based on the cursor type of the first style, so that the first cursor is displayed in the first style.

The receiving unit 1404 is further configured to receive a cursor type of the second style from the second terminal when the first cursor moves to the second content of the projection interface.

The display unit 1401 is further configured to display the first cursor based on the cursor type of the second style, so that the first cursor is displayed in the second style.

Further, when the second cursor moves to the content corresponding to the first content, a display manner of the content that is of the first interface and that corresponds to the first content is changed from the first manner to the second manner. The display unit 1401 is further configured to update the projection interface after the first cursor moves to the first content of the projection interface, where a display manner of the first content of the projection interface before update is the first manner, and a display manner of the first content of the projection interface after update is the second manner.

In another possible implementation, when the second cursor moves to the content corresponding to the second content, a display manner of the content that is of the first interface and that corresponds to the second content is changed from the third manner to the fourth manner. The display unit 1401 is further configured to update the projection interface after the first cursor moves to the second content of the projection interface, where a display manner of the second content of the projection interface before update is the third manner, and a display manner of the second content of the projection interface after update is the fourth manner.

In another possible implementation, transparency of the second cursor is greater than a threshold.

In another possible implementation, the apparatus may further include: an obtaining unit 1405, configured to: after the first cursor enters the projection interface, in a process in which the user inputs the first operation by using the input device of the first terminal, obtain a first operation parameter in a received first input event, where the first input event is a movement event corresponding to the first operation. The sending unit 1403 is specifically configured to send the first operation parameter to the second terminal, where the first operation parameter is used by the second terminal to simulate the first input event, so as to move the second cursor.

In another possible implementation, the input unit 1402 is further configured to: when the first cursor moves to the first content of the projection interface, receive a second operation input by the user by using the input device of the first terminal. The sending unit 1403 is further configured to send data of the second operation to the second terminal, where the data of the second operation is used by the second terminal to display a second interface. The display unit 1401 is further configured to update the projection interface, where content of the projection interface after update is a mirror of content of the second interface.

In another possible implementation, the obtaining unit 1405 is further configured to: after the user inputs the second operation by using the input device of the first terminal, intercept a second input event corresponding to the second operation, and obtain a second operation parameter in the second input event. The sending unit 1403 is specifically configured to send the second operation parameter to the second terminal, where the second operation parameter is used by the second terminal to simulate the second input event, so as to display the second interface.

In another possible implementation, the first operation corresponds to a movement event. The obtaining unit 1405 is further configured to enable interception of an input event, to intercept another input event other than the movement event. The sending unit 1403 is further configured to send first indication information to the second terminal, where the first indication information indicates that sharing starts.

In another possible implementation, after the first cursor moves out of the projection interface, the sending unit 1403 is further configured to send second indication information to the second terminal, where the second indication information indicates that sharing stops. The obtaining unit 1405 is further configured to cancel interception of an input event.

Figure 15:
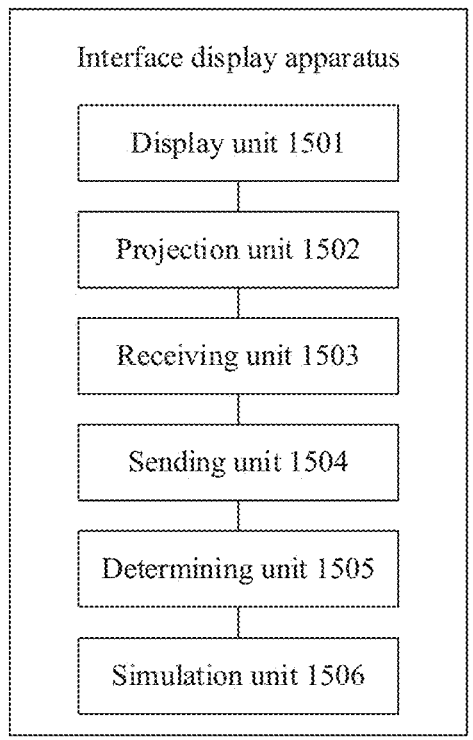
FIG. 15 is a schematic diagram of a composition of another interface display apparatus according to an embodiment of this application.

FIG. 15 is a schematic diagram of a composition of another interface display apparatus according to an embodiment of this application. The apparatus may be applied to a second terminal (for example, the foregoing mobile phone), and the second terminal is connected to the first terminal. As shown in FIG. 15, the apparatus may include a display unit 1501, a projection unit 1502, and a receiving unit 1503.

The display unit 1501 is configured to display a first interface.

The projection unit 1502 is configured to project and display the first interface on the first terminal, so that the first terminal displays a projection interface.

The display unit 1501 is further configured to display a second cursor on the first interface when a first cursor of the first terminal enters the projection interface.

The receiving unit 1503 is configured to receive a first operation input by a user by using an input device of the first terminal, where the first operation is used to move the second cursor on a display of the second terminal.

The display unit 1501 is further configured to: when the second cursor moves to first content of the first interface, display the second cursor in a first style, and/or change a display manner of the first content from a first manner to a second manner, so that when the first cursor moves to content that is of the projection interface and that corresponds to the first content, the first cursor is displayed in the first style, and/or change a display manner of the content that is of the projection interface and that corresponds to the first content from the first manner to the second manner. The display unit 1501 is further configured to: when the second cursor moves to second content of the first interface, display the second cursor in a second style, and/or change a display manner of the second content from a third manner to a fourth manner, so that when the first cursor moves to content that is of the projection interface and that corresponds to the second content, the first cursor is displayed in the second style, and/or change a display manner of the content that is of the projection interface and that corresponds to the second content from the third manner to the fourth manner.

In a possible implementation, the apparatus may further include: a sending unit 1504, configured to send a cursor type of the first style to the first terminal after the second cursor is displayed in the first style, where the cursor type of the first style is used by the first terminal to display the first cursor, so that the first cursor is displayed in the first style. The sending unit 1504 is further configured to send a cursor type of the second style to the first terminal after the second cursor is displayed in the second style, where the cursor type of the second style is used by the first terminal to display the first cursor, so that the first cursor is displayed in the second style.

In another possible implementation, transparency of the second cursor is greater than a threshold.

In another possible implementation, the receiving unit 1503 is further configured to receive, from the first terminal, an initial coordinate location at which the first cursor enters the projection interface. The apparatus may further include a determining unit 1505, configured to determine a start location based on the initial coordinate location, a size of the projection interface, and resolution of the second terminal, where the start location may be a coordinate location relative to a first corner of the display of the second terminal. The display unit 1501 is specifically configured to display the second cursor at the start location.

In another possible implementation, the receiving unit 1503 is specifically configured to receive a first operation parameter from the first terminal, where the first operation parameter is an operation parameter in a first input event received by the first terminal in a process in which the user inputs, by using the input device of the first terminal, the first operation after the first cursor enters the projection interface, and the first operation parameter includes relative displacement of the first cursor relative to the initial coordinate location. The determining unit 1505 is further configured to determine relative displacement of the second cursor relative to the start location based on the relative displacement of the first cursor relative to the initial coordinate location. The apparatus may further include a simulation unit 1506, configured to simulate the first input event based on the determined relative displacement of the second cursor relative to the start location and another parameter in the first operation parameter.

The display unit 1501 is further configured to display, on the display of the second terminal based on the first input event, an animation in which the second cursor moves.

In another possible implementation, the receiving unit 1503 is further configured to: when the second cursor moves to the first content of the first interface, receive a second operation input by the user by using the input device of the first terminal. The display unit 1501 is further configured to display a second interface in response to the second operation. The projection unit 1502 is further configured to project and display the second interface on the first terminal, so that content of the projection interface of the first terminal after update is a mirror of content of the second interface.

In another possible implementation, the receiving unit 1503 is specifically configured to receive a second operation parameter from the first terminal, where the second operation parameter is an operation parameter included in a second input event intercepted by the first terminal after the user inputs, by using the input device of the first terminal, the second operation when the first cursor moves to the content that is of the projection interface and that corresponds to the first content. The simulation unit 1506 is configured to simulate the second input event based on the second operation parameter, where the second input event is used to display the second interface.

In another possible implementation, the receiving unit 1503 is further configured to receive first indication information from the first terminal, where the first indication information indicates that sharing starts.

In another possible implementation, the receiving unit 1503 is further configured to receive second indication information from the first terminal, where the second indication information indicates that sharing stops, and the second indication information is sent by the first terminal after the first terminal determines that the first cursor moves out of the projection interface.

An embodiment of this application further provides an interface display apparatus. The apparatus may be applied to an electronic device, for example, the first terminal or the second terminal in the foregoing embodiment. The apparatus may include a processor, and a memory configured to store instructions that can be executed by the processor. When the processor is configured to execute the instructions, the interface display apparatus is enabled to implement the functions or steps performed by the mobile phone or the PC in the foregoing method embodiment.

An embodiment of this application further provides an electronic device (the electronic device may be a terminal, for example, the first terminal or the second terminal in the foregoing embodiment). The electronic device may include a display, a memory, and one or more processors. The display and the memory are coupled to the processor. The memory is configured to store computer program code. The computer program code includes computer instructions. When the processor executes the computer instructions, the electronic device may perform the functions or steps performed by the mobile phone or the PC in the foregoing method embodiment. Certainly, the electronic device includes but is not limited to the foregoing display, memory, and one or more processors. For example, for a structure of the electronic device, refer to the structure of the mobile phone shown in FIG. 3.

Figure 16:
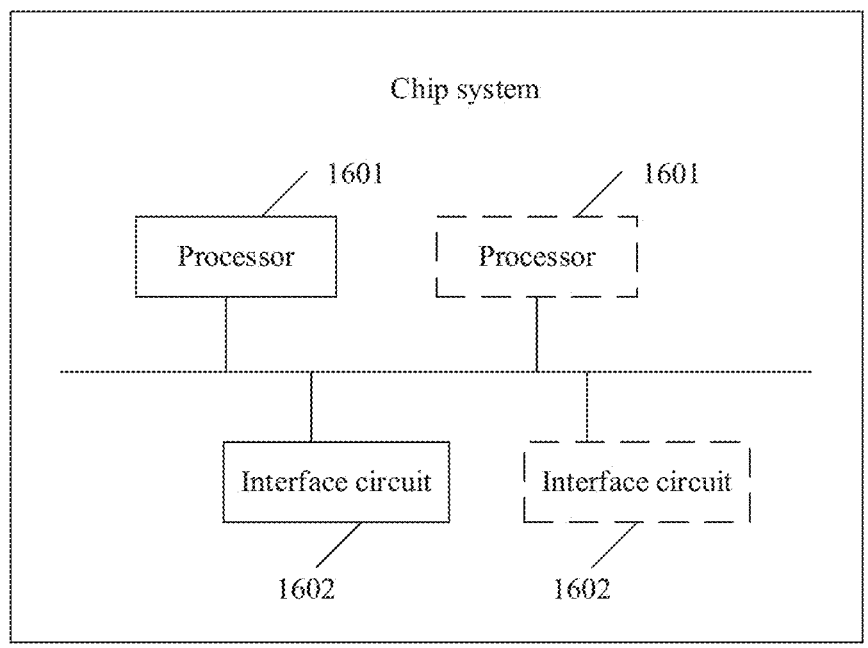
FIG. 16 is a schematic diagram of a composition of a chip system according to an embodiment of this application.

An embodiment of this application further provides a chip system. The chip system may be applied to an electronic device, for example, the terminal (for example, the first terminal or the second terminal) in the foregoing embodiment. As shown in FIG. 16, the chip system includes at least one processor 1601 and at least one interface circuit 1602. The processor 1601 may be a processor in the foregoing electronic device. The processor 1601 and the interface circuit 1602 may be interconnected through a line. The processor 1601 may receive computer instructions from a memory of the electronic device through the interface circuit 1602, and execute the computer instructions. When the computer instructions are executed by the processor 1601, the electronic device may be enabled to perform the steps performed by the mobile phone or the PC in the foregoing embodiment. Certainly, the chip system may further include another discrete device. This is not specifically limited in this embodiment of this application.

An embodiment of this application further provides a computer-readable storage medium, configured to store computer instructions run by an electronic device such as the foregoing terminal (such as a mobile phone or a PC).

An embodiment of this application further provides a computer program product, including computer instructions run by an electronic device, for example, the foregoing terminal (for example, a mobile phone or a PC).

The foregoing descriptions about implementations allow a person skilled in the art to clearly understand that, for the purpose of convenient and brief description, division of the foregoing functional modules is used as an example for illustration. In actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on an actual requirement to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, such as a USB flash drive, a removable hard disk, a read only memory (read only memory, ROM), a random access memory (random access memory. RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A first terminal, comprising:
   a first display;
   an input device configured to receive a first operation provided by a user, wherein the first operation moves a first cursor on the first display;
   a memory configured to store programming instructions; and
   a processor coupled to the first display, the input device, and the memory, wherein the processor is configured to execute the programming instructions to cause the first terminal to:
   display a projection interface in a portion of the first display, wherein content of the projection interface is a mirror of content of a first interface displayed on a second display of a second terminal;
   display, on the first display in response to the first operation, an animation in which the first cursor moves;
   determine that the first cursor enters a boundary of the projection interface;
   send an initial coordinate location at which the first cursor enters the boundary of the projection interface to the second terminal;
   send first operation data of the first operation to the second terminal, wherein the initial coordinate location is a coordinate location of the first cursor relative to a first corner of the projection interface when the first cursor enters the boundary of the projection interface, and wherein the second terminal is configured to use the initial coordinate location to display a second cursor on the second display, wherein the first operation data is to move the second cursor on the second display, so that when the first cursor moves to first content, the second cursor moves to content that is of the first interface and that corresponds to the first content, and wherein when the second cursor moves to the content corresponding to the first content, a cursor style of the second cursor is a first style, and so that when the first cursor moves to second content, the second cursor moves to content that is of the first interface and that corresponds to the second content, and when the second cursor moves to the content corresponding to the second content, the cursor style of the second cursor is a second style;
   generate a first visual feedback response on the first display when the first cursor moves to the first content of the projection interface, wherein the first visual feedback response comprises a cursor style of the first cursor being the first style;
   generate a second visual feedback response on the first display when the first cursor moves to the second content of the projection interface, wherein the second visual feedback response comprises the cursor style of the first cursor being the second style; and
   receive, from the second terminal, a cursor type of the first style and a cursor type of the second style.

2. The first terminal of claim 1, wherein the processor is further configured to execute the programming instructions to cause the first terminal to:

change, a display manner of the content that is of the first interface and that corresponds to the first content when the second cursor moves to the content corresponding to the first content, from a first manner to a second manner;

update the projection interface after the first cursor moves to the first content of the projection interface, wherein the display manner of the first content of the projection interface before update is the first manner, and wherein the display manner of the first content of the projection interface after update is the second manner;

change, from a third manner to a fourth manner when the second cursor moves to the content corresponding to the second content, a display manner of the content of the first interface and that corresponds to the second content; and update the projection interface after the first cursor moves to the second content of the projection interface, wherein the display manner of the second content of the projection interface before update is the third manner, and wherein the display manner of the second content of the projection interface after update is the fourth manner.

3. The first terminal of claim 1, further comprising:

receiving, using the input device, a first input event, wherein the first input event occurs when the first cursor enters the projection interface during the first operation; and obtaining a first operation parameter from the first input event, wherein the processor is further configured to execute the programming instructions to cause the first terminal to send the first operation data to the second terminal by sending the first operation parameter to the second terminal to simulate the first input event using the second cursor.

4. The first terminal of claim 1, wherein the processor is further configured to execute the programming instructions to cause the first terminal to:

receive, by the input device when the first cursor moves to the first content of the projection interface, a second operation provided by the user;

send second operation data of the second operation to the second terminal to display a second interface; and update the projection interface to mirror content of the second interface.

5. The first terminal of claim 4, wherein the processor is further configured to execute the programming instructions to cause the first terminal to:

intercept, after the input device receives the second operation, a second input event corresponding to the second operation; and obtain a second operation parameter from the second input event, wherein the processor is further configured to execute the programming instructions to cause the first terminal to send the second operation data to the second terminal by sending the second operation parameter to the second terminal to simulate the second input event by displaying the second interface.

6. The first terminal of claim 1, wherein the processor is further configured to execute the programming instructions to cause the first terminal to:

enable, after the first cursor enters the projection interface, interception of a third input event, wherein the third input event is different than the first operation;

start, when the interception of the third input event is enabled, an input device sharing mode; and send first indication information to the second terminal, wherein the first indication information indicates that the input device sharing mode starts.

7. The first terminal of claim 6, wherein the processor is further configured to execute the programming instructions to cause the first terminal to:

cancel, after the first cursor moves out of the projection interface, interception of the third input event;

stop, when the interception of the third input event is cancelled, the input device sharing mode; and send, after interception of the third input event is cancelled, second indication information to the second terminal, wherein the second indication information indicates that the input device sharing mode stops.

8. A method comprising:

displaying, on a second terminal display of a second terminal, a first interface;

receiving, by a first terminal from the second terminal, data of the first interface;

displaying, in a portion of a first terminal display of the first terminal, a projection interface, wherein content of the projection interface is a mirror of content of the first interface;

receiving, at a first terminal input device of the first terminal, a first operation provided by a user, wherein the first operation is to move a first cursor on the first terminal display;

displaying, on the first terminal display in response to the first operation, an animation in which the first cursor moves;

displaying, by the second terminal, a second cursor on the first interface when the first cursor enters the projection interface;

receiving, by the second terminal, the first operation, wherein the first operation is to move the second cursor on the second terminal display;

generating, on the first terminal display, a first visual feedback response when the first cursor moves to first content of the projection interface, wherein the first visual feedback response comprises at least one of a cursor style of the first cursor being a first style, or a display manner of the first content changing from a first manner to a second manner;

generating, on the first terminal display, a second visual feedback response when the first cursor moves to second content of the projection interface, wherein the second visual feedback response comprises at least one of the cursor style of the first cursor being a second style, or a display manner of the second content changing from a third manner to a fourth manner;

displaying, by the second terminal when the second cursor moves to content that is of the first interface and that corresponds to the first content, the second cursor in the first style;

sending, by the second terminal to the first terminal, a cursor type of the first style;

displaying, by the first terminal, the first cursor based on the cursor type of the first style;

displaying, by the second terminal when the second cursor moves to content that is of the first interface and that corresponds to the second content, the second cursor in the second style;

sending, by the second terminal to the first terminal, a cursor type of the second style; and displaying, by the first terminal, the first cursor based on the cursor type of the second style.

9. The method of claim 8, further comprising:
changing, by the second terminal when the second cursor moves to the content that is of the first interface and that corresponds to the first content, a display manner of the content that is of the first interface and that corresponds to the first content from the first manner to the second manner;
updating, by the first terminal, the projection interface;
changing, by the second terminal when the second cursor moves to the content that is of the first interface and that corresponds to the second content, a display manner of the content that is of the first interface and that corresponds to the second content from the third manner to the fourth manner; and
updating, by the first terminal, the projection interface.

10. The method of claim 8, further comprising:
receiving, a first input event, wherein the first input event occurs when the first cursor enters the projection interface during the first operation;
obtaining a first operation parameter from the first input event; and
sending the first operation parameter to the second terminal to simulate the first input event using the second cursor.

11. The method of claim 8, further comprising:
receiving, when the first cursor moves to the first content of the projection interface, a second operation provided by the user;
sending second operation data of the second operation to the second terminal to display a second interface; and
updating the projection interface to mirror content of the second interface.

12. The method of claim 11, further comprising:
intercepting, after receiving the second operation, a second input event corresponding to the second operation; and
obtaining a second operation parameter from the second input event,
wherein sending the second operation data to the second terminal comprises sending the second operation parameter to the second terminal to simulate the second input event by displaying the second interface.

13. The method of claim 8, further comprising:
enabling, after the first cursor enters the projection interface, interception of a third input event, wherein the third input event is different than the first operation;
starting, when the interception of the third input event is enabled, an input device sharing mode; and
sending first indication information to the second terminal, wherein the first indication information indicates that the input device sharing mode starts.

14. The method of claim 13, further comprising:
canceling, after the first cursor moves out of the projection interface, interception of the third input event;
stopping, when the interception of the third input event is cancelled, the input device sharing mode; and
sending, after interception of the third input event is cancelled, second indication information to the second terminal, wherein the second indication information indicates that the input device sharing mode stops.

15. A computer program product comprising instructions that are stored on a non-transitory computer-readable medium and that, when executed by a processor, cause a terminal to:
receive a first operation provided by a user, wherein the first operation moves a first cursor on a first display;
display a projection interface in a portion of the first display, wherein content of the projection interface is a mirror of content of a first interface displayed on a second display of a second terminal;
display, on the first display in response to the first operation, an animation in which the first cursor moves;
determine that the first cursor enters a boundary of the projection interface;
send an initial coordinate location at which the first cursor enters the boundary of the projection interface to the second terminal;
send first operation data of the first operation to the second terminal, wherein the initial coordinate location is a coordinate location of the first cursor relative to a first corner of the projection interface when the first cursor enters the boundary of the projection interface, and wherein the second terminal is configured to use the initial coordinate location to display a second cursor on the second display, wherein the first operation data is to move the second cursor on the second display, so that when the first cursor moves to first content, the second cursor moves to content that is of the first interface and that corresponds to the first content, and wherein when the second cursor moves to the content corresponding to the first content, a cursor style of the second cursor is a first style, and so that when the first cursor moves to second content, the second cursor moves to content that is of the first interface and that corresponds to the second content, and when the second cursor moves to the content corresponding to the second content, the cursor style of the second cursor is a second style;
generate a first visual feedback response on the first display when the first cursor moves to the first content of the projection interface, wherein the first visual feedback response comprises a cursor style of the first cursor being the first style;
generate a second visual feedback response on the first display when the first cursor moves to the second content of the projection interface, wherein the second visual feedback response comprises the cursor style of the first cursor being the second style; and
receive, from the second terminal, a cursor type of the first style and a cursor type of the second style.

16. The computer program product of claim 15, wherein the instructions, when executed by the processor, further cause the terminal to:
change, a display manner of the content that is of the first interface and that corresponds to the first content when the second cursor moves to the content corresponding to the first content, from a first manner to a second manner;
update the projection interface after the first cursor moves to the first content of the projection interface, wherein the display manner of the first content of the projection interface before update is the first manner, and wherein the display manner of the first content of the projection interface after update is the second manner;
change, from a third manner to a fourth manner when the second cursor moves to the content corresponding to the second content, a display manner of the content of the first interface and that corresponds to the second content; and
update the projection interface after the first cursor moves to the second content of the projection interface, wherein the display manner of the second content of the projection interface before update is the third manner, and wherein the display manner of the second content of the projection interface after update is the fourth manner.

17. The computer program product of claim 15, wherein the instructions, when executed by the processor, further cause the terminal to:
receive a first input event, wherein the first input event occurs when the first cursor enters the projection interface during the first operation;
obtain a first operation parameter from the first input event; and
send the first operation data to the second terminal by sending the first operation parameter to the second terminal to simulate the first input event using the second cursor.

18. The computer program product of claim 15, wherein the instructions, when executed by the processor, further cause the terminal to:
receive, when the first cursor moves to the first content of the projection interface, a second operation provided by the user;
send second operation data of the second operation to the second terminal to display a second interface; and
update the projection interface to mirror content of the second interface.

* * * * *